(12) United States Patent
He et al.

(10) Patent No.: US 10,890,882 B2
(45) Date of Patent: Jan. 12, 2021

(54) METHOD AND APPARATUS FOR DESIGNING MODEL-BASED CONTROL HAVING SPATIAL ROBUSTNESS FOR MULTIPLE ARRAY CROSS-DIRECTION (CD) WEB MANUFACTURING OR PROCESSING SYSTEMS OR OTHER SYSTEMS

(71) Applicant: Honeywell Limited, Mississauga (CA)

(72) Inventors: Ning He, Edmonton (CA); Michael Forbes, North Vancouver (CA); Johan U. Backstrom, North Vancouver (CA); Tongwen Chen, Edmonton (CA)

(73) Assignee: Honeywell International Inc., Morris Plains, NJ (US)

( * ) Notice: Subject to any disclaimer, the term of this patent is extended or adjusted under 35 U.S.C. 154(b) by 227 days.

(21) Appl. No.: 15/889,005

(22) Filed: Feb. 5, 2018

(65) Prior Publication Data

US 2018/0253086 A1 Sep. 6, 2018

Related U.S. Application Data

(60) Provisional application No. 62/467,622, filed on Mar. 6, 2017, provisional application No. 62/467,803, filed on Mar. 6, 2017.

(51) Int. Cl.
*G05B 13/04* (2006.01)
*G05B 19/418* (2006.01)
(Continued)

(52) U.S. Cl.
CPC ......... *G05B 13/042* (2013.01); *G05B 13/047* (2013.01); *G05B 19/41885* (2013.01);
(Continued)

(58) Field of Classification Search
CPC ............... G05B 13/042; G05B 13/047; G05B 19/41885; G05B 2219/42155;
(Continued)

(56) References Cited

U.S. PATENT DOCUMENTS 7,650,195 B2 * 1/2010 Fan ....................... D21G 9/0045
700/29
7,987,003 B2 7/2011 Hoffberg et al.
(Continued)

OTHER PUBLICATIONS

Greg E. Stewart, "Two-Dimensional Response Analysis and Insights for Weight Selection in Cross-Directional Model Predictive Control", Dec. 2003, IEEE, Proceedings of the 42nd IEEE Conference on Decision and Control, pp. 3717-3723 (Year: 2003).*
(Continued)

*Primary Examiner* — Robert E Fennema
*Assistant Examiner* — Christopher W Carter

(57) ABSTRACT

A method includes obtaining one or more models associated with a model-based controller in an industrial process having multiple actuator arrays and performing spatial tuning of the controller. The spatial tuning includes identifying weighting matrices that suppress one or more frequency components in actuator profiles of the actuator arrays. The spatial tuning could also include finding a worst-case cutoff frequency over all output channels for each process input, designing the weighting matrices to penalize higher-frequency actuator variability based on the model(s) and the cutoff frequencies, and finding a multiplier for a spatial frequency weighted actuator variability term in a function that guarantees robust spatial stability. The controller could be configured to use a function during control of the industrial process, where a change to one or more terms of the function alters operation of the controller and the industrial process and at least one term is based on the weighting matrices.

20 Claims, 5 Drawing Sheets

(51) Int. Cl.
*G06Q 10/06* (2012.01)
*G06Q 50/04* (2012.01)

(52) U.S. Cl.
CPC . *G06Q 10/067* (2013.01); *G05B 2219/42155* (2013.01); *G06Q 50/04* (2013.01); *Y02P 90/02* (2015.11); *Y02P 90/30* (2015.11)

(58) Field of Classification Search
CPC ...... G06Q 10/067; G06Q 50/04; Y02P 90/18; Y02P 90/30
USPC ....................................................... 700/122
See application file for complete search history.

(56) References Cited

U.S. PATENT DOCUMENTS

| | | | |
|---|---|---|---|
| 9,557,724 | B2 | 1/2017 | Chu et al. |
| 2012/0130547 | A1 | 5/2012 | Fadell et al. |
| 2015/0268645 | A1 | 9/2015 | Shi et al. |
| 2016/0246185 | A1 | 8/2016 | Ypma et al. |
| 2016/0357162 | A1 | 12/2016 | He et al. |
| 2018/0087219 | A1 | 3/2018 | Backstrom et al. |
| 2018/0087220 | A1 | 3/2018 | He et al. |
| 2018/0087221 | A1 | 3/2018 | He et al. |

OTHER PUBLICATIONS

Hernan Miranda, "Predictive Torque Control of Induction Machines Based on State-Space Models", Jun. 2009, IEEE Transactions on Industrial Electronics, vol. 56, No. 6, pp. 1916-1924 (Year: 2009).*
International Search Report and Written Opinion of the International Searching Authority for International Patent Application No. PCT/CA2018/000045 dated Apr. 26, 2018, 9 pages.
Backstrom et al., "Constrained model predictive control for cross directional multi-array processes—A look at its implementation on a linerboard machine", Pulp & Paper Canada, May 2001, 5 pages.
Backstrom, "Identification & Multivariable Control of Supercalenders", Proceedings of Control Systems 2002, Jun. 2002, 8 pages.
Bartlett et al., "Quadratic programming algorithms for large-scale model predictive control", Journal of Process Control 12, 2002, 21 pages.
Fan et al., "Two-dimensional frequency analysis for unconstrained model predictive control of cross-directional processes", Automatica 40, 2004, 13 pages.
Gorinevsky et al., "Performance Analysis of Cross-Direction Process Control Using Multivariable and Spectral Models", IEEE Transactions on Control Systems Technology, vol. 8, No. 4, Jul. 2000, 32 pages.
Gorinevsky et al., "Technical Notes and Correspondence", IEEE Transactions on Automatic Control, vol. 46, No. 10, Oct. 2001, 6 pages.
Duncan, "The cross-directional control of web forming process", Ph.D. dissertation, University of London, 1989, 137 pages.
Laughlin et al., "Robust Performance of Cross-directional Basis-weight Control in Paper Machines", Automatica, vol. 29, No. 6, 1993, 16 pages.
Duncan et al., "The Spatial Bandwidth of Cross-directional Control Systems for Web Processes", Automatica, vol. 33, No. 2, 1997, 15 pages.
Stewart et al., "Two-Dimensional Loop Shaping", Automatica, vol. 39, No. 5, May 2003, 31 pages.
Stewart et al., "Feedback Controller Design for a Spatially Distributed System: The Paper Machine Problem", IEEE Transactions on Control Systems Technology, vol. 11, No. 5, 2003, 17 pages.
Fan et al., "Approximate Steady-State Performance Prediction of Large-Scale Constrained Model Predictive Control Systems", IEEE Transactions on Control Systems Technology, vol. 13, No. 6, Nov. 2005, 12 pages.
Fan et al., "Automated Tuning of Large-Scale Multivariable Model Predictive Controllers for Spatially Distributed Processes", Proceedings of the 2006 American Control Conference, Jun. 2006, 7 pages.
He et al., "Robust Tuning of Cross-Directional Model Predictive Controllers for Paper-Making Processes", IEEE Transactions on Control Systems Technology (Early Access), Aug. 2017, 16 pages.
VanAntwerp et al., "Cross-directional control of sheet and film processes", Automatica, vol. 43, 2007, 21 pages.
Rojas et al., "Spatial frequency antiwindup strategy for cross-directional control problems", IEE Proceedings—Control Theory and Applications, vol. 149, Issue 5, Sep. 2002, 9 pages.
Featherstone et al., "Control-Oriented Modeling of Sheet and Film Processes", AIChE Journal, vol. 43, No. 8, Aug. 1997, 13 pages.
Gorinevsky et al., "Identification Tool for Cross-Directional Processes", IEEE Transactions on Control Systems Technology, vol. 11, No. 5, 2003, 11 pages.
Gorinevsky et al., "Structured Uncertainty Analysis of Spatially Distributed Paper Machine Process Control", Proceedings of the American Control Conference, Jun. 2001, 6 pages.
Featherstone et al., "Identification and Control of Sheet and Film Processes—Advances in Industrial Control", Springer-Verlag, London, 2000, 23 pages.
He et al., "Automated Two-Degree-of-Freedom Model Predictive Control Tuning", Industrial & Engineering Chemistry Research, vol. 54, No. 43, 2015, 14 pages.
Shi et al., "Robust Tuning of Machine Directional Predictive Control of Paper Machines", Industrial & Engineering Chemistry Research, vol. 54, 2015, 15 pages.
Fan, "Model Predictive Control for Multiple Cross-Directional Processes: Analysis, Tuning, and Implementation", Thesis for Ph.D, University of British Columbia, Sep. 2003, 172 pages.
Angeli et al., "An ellipsoidal off-line MPC scheme for uncertain polytopic discrete-time systems", Automatica 44, 2008, 7 pages.
Vlassis et al., "Polytopic uncertainty for linear systems: New and old complexity results", Systems & Control Letters 67, 2014, 5 pages.
Shi et al., "On finite-horizon l2-induced norms of discrete-time switched linear systems", Automatica 49, 2013, 8 pages.
Astrom et al., "Design of PI Controllers based on Non-Convex Optimization", Automatica, vol. 34, No. 5, 1998, 17 pages.
He et al., "Method and Apparatus for Designing Model-based Control Having Temporally Robust Stability and Performance for Multiple-Array Cross-Direction (CD) Web Manufacturing or Processing Systems or Other Systems ", U.S. Appl. No. 15/888,990, filed Feb. 5, 2018, 53 pages.

* cited by examiner

METHOD AND APPARATUS FOR DESIGNING MODEL-BASED CONTROL HAVING SPATIAL ROBUSTNESS FOR MULTIPLE ARRAY CROSS-DIRECTION (CD) WEB MANUFACTURING OR PROCESSING SYSTEMS OR OTHER SYSTEMS

CROSS-REFERENCE TO RELATED APPLICATIONS AND PRIORITY CLAIM

This application claims priority under 35 U.S.C. § 119(e) to U.S. Provisional Patent Application No. 62/467,622 and U.S. Provisional Patent Application No. 62/467,803, both of which were filed on Mar. 6, 2017. Both of these provisional applications are hereby incorporated by reference in their entirety.

TECHNICAL FIELD

This disclosure relates generally to industrial process control and automation systems. More specifically, this disclosure relates to a method and apparatus for designing model-based control having spatial robustness for multiple-array cross-direction (CD) web manufacturing or processing systems or other systems.

BACKGROUND

Sheets or other webs of material are used in a variety of industries and in a variety of ways. These materials can include paper, multi-layer paperboard, and other products manufactured or processed in long webs. As a particular example, long webs of paper can be manufactured and collected in reels. These webs of material are often manufactured or processed at high rates of speed, such as speeds of up to one hundred kilometers per hour or more.

It is often necessary or desirable to measure one or more properties of a web of material as the web is being manufactured or processed. The measurements can be used by one or more process controllers to adjust the manufacturing or processing of the web. A process controller that implements model predictive control (MPC) or other model-based control can use one or more models to predict the future behavior of a web manufacturing or processing system. Control signals for adjusting the system are generated based on the predicted behavior of the system. The control of a property across a width of the web is referred to as cross-direction ("CD") control, while the control of a property along a length of the web is referred to as machine-direction ("MD") control.

CD control of a web is a difficult control problem when there are multiple actuator beams and multiple measurements in a web manufacturing or processing system. MPC or other model-based control could be used to address this problem. However, the tuning of an MPC or other model-based controller to achieve robust performance can be challenging for a number of reasons. One reason is that the tuning parameters typically available to users are not intuitive, and trial and error tuning attempts can be time-consuming and frustrating. Another reason is that automated tuning algorithms relying on robust control theory may require a user with an advanced understanding of control theory and involve abstract parameters.

SUMMARY

This disclosure provides a method and apparatus for designing model-based control having spatial robustness for multiple-array cross-direction (CD) web manufacturing or processing systems or other systems.

In a first embodiment, a method includes obtaining one or more models associated with a model-based controller in an industrial process having multiple actuator arrays. The method also includes performing spatial tuning of the controller, where the spatial tuning includes identifying weighting matrices that suppress one or more frequency components in actuator profiles of the actuator arrays.

In a second embodiment, an apparatus includes at least one memory configured to store one or more models associated with a model-based controller in an industrial process having multiple actuator arrays. The apparatus also includes at least one processing device configured to perform spatial tuning of the controller. To perform the spatial tuning, the at least one processing device is configured to identify weighting matrices that suppress one or more frequency components in actuator profiles of the actuator arrays.

In a third embodiment, a non-transitory computer readable medium contains instructions that when executed cause at least one processing device to obtain one or more models associated with a model-based controller in an industrial process having multiple actuator arrays and perform spatial tuning of the controller. The spatial tuning includes identifying weighting matrices that suppress one or more frequency components in actuator profiles of the actuator arrays.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, cross-direction (CD) control of a web of material is a difficult control problem when there are multiple actuator beams and multiple measurements in a web manufacturing or processing system. Model predictive control (MPC) or other model-based control could be used to address this problem, but there are various issues with tuning an MPC or other model-based controller.

There are multiple aspects to a CD tuning problem, including spatial tuning and temporal tuning. Spatial tuning involves tuning a controller to reduce the steady-state variability of a web's CD profile without considering how the profile will move from a current profile to a final profile. Temporal tuning involves choosing parameters so that the controller makes actuator movements that bring actuator and measurement profiles from their initial values to their final values quickly and smoothly, regardless of the specific profiles.

This disclosure describes automated tuning techniques that provide improved or optimal controller tuning parameters for MPC or other model-based controllers. The automated tuning techniques involve separate spatial tuning and temporal tuning for an MPC or other model-based controller. The controller tuning parameters can be generated using intuitive information about the quality of a process model and the desired temporal control performance. As a result, a non-expert in control theory can provide a small amount of information to a tuning algorithm, and the tuning algorithm can operate to tune a controller.

Figure 1:
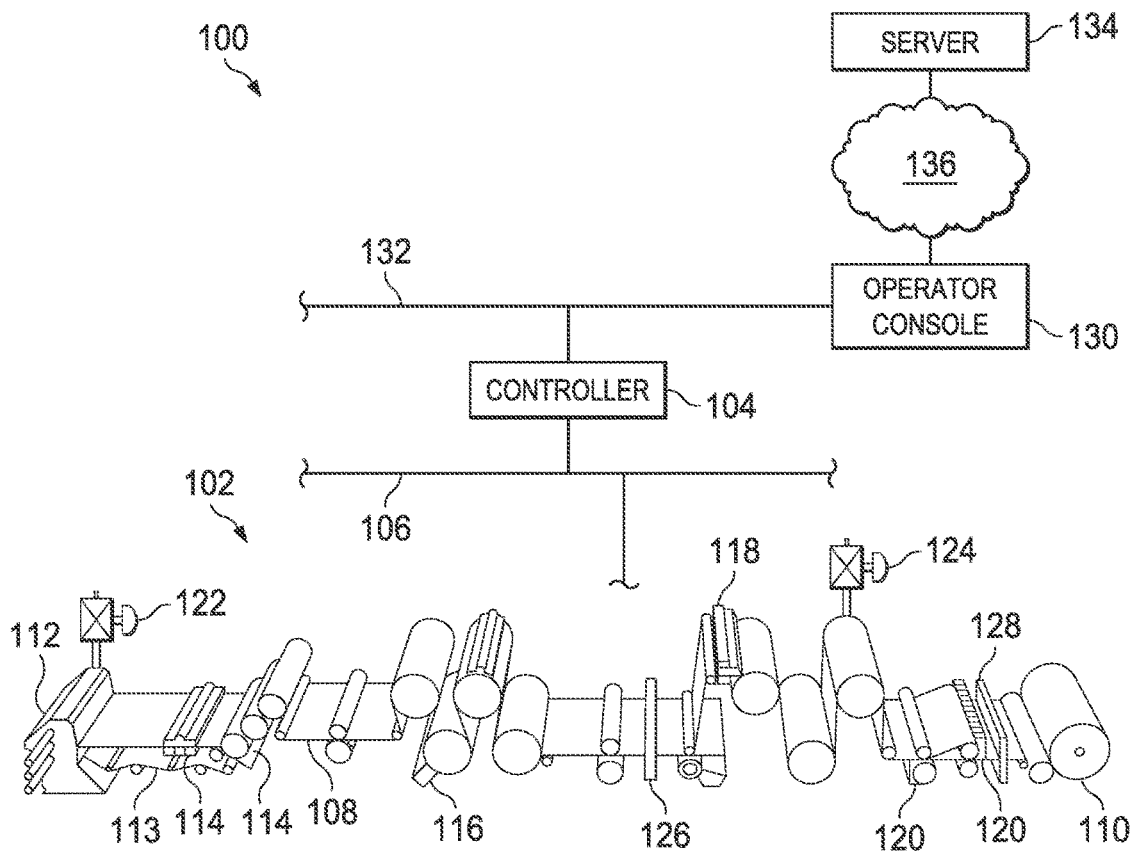
FIG. 1 illustrates an example web manufacturing or processing system according to this disclosure.

FIG. 1 illustrates an example web manufacturing or processing system 100 according to this disclosure. As shown in FIG. 1, the system 100 includes a paper machine 102, a controller 104, and a network 106. The paper machine 102 includes various components used to produce a paper product, namely a paper web 108 that is collected at a reel 110. The controller 104 monitors and controls the operation of the paper machine 102, which may help to maintain or increase the quality of the paper web 108 produced by the paper machine 102. In the following description, the machine-direction (MD) of the web 108 denotes the direction along the (longer) length of the web 108, while the cross-direction (CD) of the web 108 denotes the direction along the (shorter) width of the web 108. Both MD and CD control of web properties could occur in the system 100 in order to help ensure that quality specifications or other specifications of the web 108 are satisfied.

In this example, the paper machine 102 includes at least one headbox 112, which distributes a pulp suspension uniformly across the machine onto a continuous moving wire screen or mesh 113. The pulp suspension entering the headbox 112 may contain, for example, 0.2-3% wood fibers, fillers, and/or other materials, with the remainder of the suspension being water.

Arrays of drainage elements 114, such as vacuum boxes, remove as much water as possible to initiate the formation of the web 108. An array of steam actuators 116 produces hot steam that penetrates the paper web 108 and releases the latent heat of the steam into the paper web 108. An array of rewet shower actuators 118 adds small droplets of water (which may be air atomized) onto the surface of the paper web 108. The paper web 108 is then often passed through a calender having several nips of counter-rotating rolls. Arrays of induction heating actuators 120 heat the shell surfaces of various ones of these rolls.

Two additional actuators 122-124 are shown in FIG. 1. A thick stock flow actuator 122 controls the consistency of incoming stock received at the headbox 112. A steam flow actuator 124 controls the amount of heat transferred to the paper web 108 from drying cylinders. The actuators 122-124 could, for example, represent valves controlling the flow of stock and steam, respectively. These actuators may be used for controlling the dry weight and moisture of the paper web 108. Additional flow actuators may be used to control the proportions of different types of pulp and filler material in the thick stock and to control the amounts of various additives (such as retention aid or dyes) that are mixed into the stock.

This represents a brief description of one type of paper machine 102 that may be used to produce a paper product. Additional details regarding this type of paper machine 102 are well-known in the art and are not needed for an understanding of this disclosure.

In order to control the paper-making process, one or more properties of the paper web 108 may be continuously or repeatedly measured. The web properties can be measured at one or various stages in the manufacturing process. This information may then be used to adjust the paper machine 102, such as by adjusting various actuators within the paper machine 102. This may help to compensate for any variations of the web properties from desired targets, which may help to ensure the quality of the web 108.

As shown in FIG. 1, the paper machine 102 includes one or more scanners 126-128, each of which may include one or more sensors. Each scanner 126-128 is capable of measuring one or more characteristics of the paper web 108. For example, each scanner 126-128 could include sensors for measuring the tension, caliper, moisture, anisotropy, basis weight, color, gloss, sheen, haze, surface features (such as roughness, topography, or orientation distributions of surface features), or any other or additional characteristics of the paper web 108.

Each scanner 126-128 includes any suitable structure or structures for measuring or detecting one or more characteristics of the paper web 108, such as one or more sets of sensors. The use of scanners represents one particular embodiment for measuring web properties. Other embodiments could be used, such as those including one or more stationary sets or arrays of sensors, deployed in one or a few locations across the web or deployed in a plurality of locations across the whole width of the web such that substantially the entire web width is measured.

The controller 104 receives measurement data from the scanners 126-128 and uses the data to control the paper machine 102. For example, the controller 104 may use the measurement data to adjust any of the actuators or other components of the paper machine 102. The controller 104 includes any suitable structure for controlling the operation of at least part of the paper machine 102, such as a computing device. Note that while a single controller 104 is shown here, multiple controllers 104 could be used, such as different controllers that control different variables of the web.

The network 106 is coupled to the controller 104 and various components of the paper machine 102 (such as the actuators and scanners). The network 106 facilitates communication between components of the system 100. The network 106 represents any suitable network or combination of networks facilitating communication between components in the system 100. The network 106 could, for example, represent a wired or wireless Ethernet network, an electrical signal network (such as a HART or FOUNDA- TION FIELDBUS network), a pneumatic control signal network, or any other or additional network(s).

The controller(s) 104 can operate to control one or more aspects of the paper machine 102 using one or more models. For example, each model could associate one or more manipulated variables with one or more controlled variables. A controlled variable generally represents a variable that can be measured or inferred and that is ideally controlled to be at or near a desired setpoint or within a desired range of values. A manipulated variable generally represents a variable that can be adjusted in order to alter one or more controlled variables.

In order to tune a controller 104, at least one operator station 130 can communicate with the controller 104 over a network 132. The operator station 130 generally represents a computing device that supports one or more techniques for tuning of MPC and other model-based controllers.

The techniques for tuning of model-based controllers are described in more detail below. In general, these techniques involve performing spatial tuning of a controller and temporal tuning of the controller. Spatial tuning generally involves attempting to tune weighting matrices used by the controller so that a steady-state property across a web is consistent. In some embodiments, the spatial tuning generally includes identifying weighting matrices that suppress one or more frequency components (such as one or more high-frequency components) in actuator profiles of certain actuators. Temporal tuning generally involves attempting to satisfy time-domain performance indices, such as settling times and overshoots (which are more intuitive to technician-level operators, maintenance personnel, or other non-expert personnel who may not be intimately familiar with control theory). In some embodiments, the temporal tuning generally includes adjusting one or more parameters of a multivariable temporal filter that is used to smooth reference trajectories of the actuator profiles. A tuning algorithm for model-based controllers could use one or both of the spatial tuning and the temporal tuning techniques described in this patent document.

In particular embodiments, the spatial tuning involves the following steps. For each process input, the worst-case cutoff frequency over all output channels considering all process models is found, given parametric uncertainty. Based on the process models and the worst-case cutoff frequencies, a set of weighting matrices is designed to penalize high-frequency actuator variability. A multiplier for a spatial frequency weighted actuator variability term in an MPC cost function is found that guarantees robust spatial stability.

In particular embodiments, the temporal tuning involves the following steps. Uncertainty specifications are provided for temporal parameters of the process models, and overshoot limits (such as 2σ or "2 sigma" overshoot limits) are specified for the CD actuator profiles. Robust stability theory is used to find a minimum bound for profile trajectory tuning parameters, and a frequency-domain technique is used to help reduce the search range for the profile trajectory tuning parameters. An intelligent search is performed for the tuning parameters that minimize measurement 2σ settling times without exceeding the overshoot limits.

Note that the mathematics involved in these types of tuning operations are more complicated when there are multiple actuator beams compared to a single actuator beam. The concept of making a simplifying approximation (using the robust control theoretic idea of characterizing a group of uncertain systems by the polytopic system) can be used to control the computational difficulty of finding the spatial frequency weighted actuator variability term multiplier in the last step of the spatial tuning. Also, the concept of using process domain knowledge to choose dominant input-output pairings can be used to help reduce the computational difficulty of the temporal tuning. In addition, the temporal tuning algorithm may rely on a process simulation, which can take more and more time as the size of the process (defined by the number of actuator beams and measurements profiles) increases. In some embodiments, an event-trigger simulation method is used to reduce simulation time without reducing accuracy. Additional details regarding example implementations of these types of spatial and temporal tuning techniques are provided in the description below. Note that these details relate to specific implementations of the tuning techniques and that other implementations could be used in any given system.

Each operator station 130 denotes any suitable computing device that can execute logic (such as one or more software applications) to perform controller tuning. Each operator station 130 could, for example, denote a desktop computer, laptop computer, or tablet computer. The network 132 represents any suitable network or combination of networks that can transport information, such as an Ethernet network. Note that while the operator station 130 is described as implementing the technique(s) for tuning of model-based controllers, other types of devices could also be used. For instance, the operator station 130 could interact with a server 134 via a network 136, and the server 134 could execute the algorithms used to implement one or more techniques for tuning of model-based controllers. In this case, the operator station 130 could present a graphical user interface and interact with a user. This may allow, for example, an operator of the server 134 to provide the controller tuning as a service. The network 136 could denote any suitable network or combination of networks, such as the Internet.

In some embodiments, the tuning algorithm could be implemented using one or more software routines that are executed by one or more processors of one or more computing devices. As a particular example, the tuning algorithm could be implemented using the MATLAB software package. Also, the software could support a user interface that allows a user to enter the problem information in a simple manner and to obtain tuning results of the algorithm.

Although FIG. 1 illustrates one example of a web manufacturing or processing system 100, various changes may be made to FIG. 1. For example, other systems could be used to produce other paper or non-paper products. Also, while shown as including a single paper machine 102 with various components and a single controller 104, the system 100 could include any number of paper machines or other machinery having any suitable structure, and the system 100 could include any number of controllers. In addition, FIG. 1 illustrates one example operational environment in which MPC or other model-based controller(s) can be tuned. This functionality could be used in any other suitable system, regardless of whether the system is used to manufacture or process webs of material.

Figure 2:
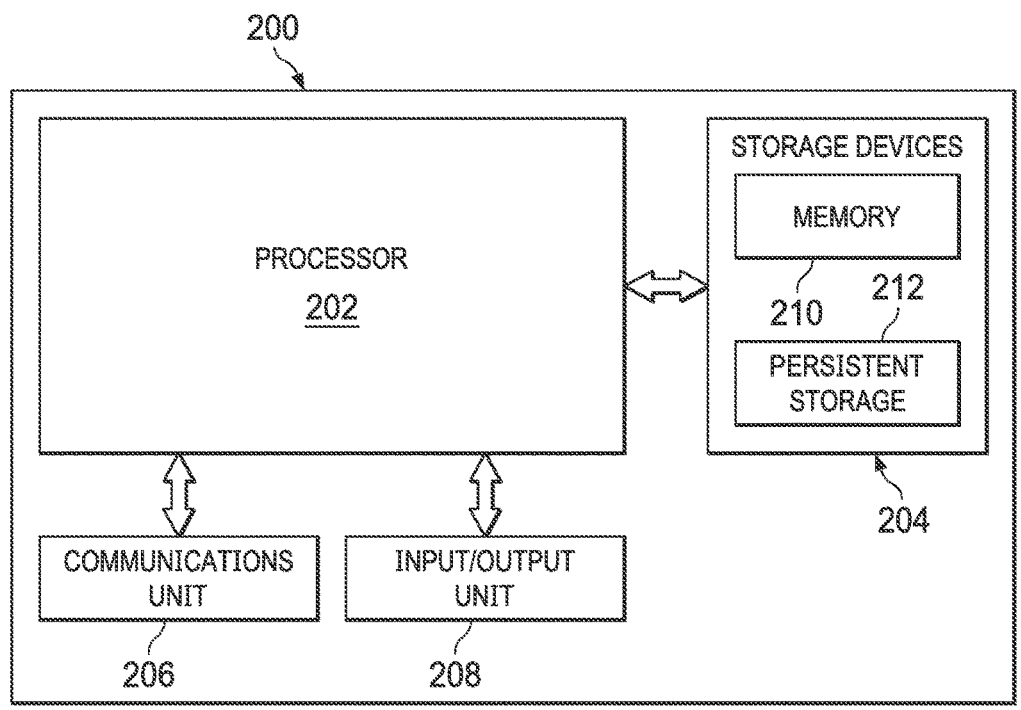
FIG. 2 illustrates an example device supporting the design of multiple-array cross-direction (CD) model-based control for web manufacturing or processing systems or other systems according to this disclosure.

FIG. 2 illustrates an example device 200 supporting the design of multiple-array CD model-based control for web manufacturing or processing systems or other systems according to this disclosure. The device 200 could, for example, denote the operator station 130 or the server 134 in FIG. 1. However, the device 200 could be used to tune any suitable model-based controller(s) in any suitable system(s).

As shown in FIG. 2, the device 200 includes at least one processor 202, at least one storage device 204, at least one communications unit 206, and at least one input/output (I/O)

unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 supporting the design of multiple-array CD model-based control for web manufacturing or processing systems or other systems, various changes may be made to FIG. 2. For example, various components in FIG. 2 could be combined, further subdivided, or omitted and additional components could be added according to particular needs. Also, computing devices come in a wide variety of configurations, and FIG. 2 does not limit this disclosure to any particular computing device.

The following description provides details of specific implementations of the spatial and temporal tuning techniques mentioned above. More specifically, the following description discusses the robust tuning problem of multiple-array cross-direction model predictive control (CD-MPC) for uncertain paper-making processes, although the same or similar approaches could be used with other processes. An automated controller tuning algorithm is described that enables (i) the spatial variability of measurement profiles to be reduced and (ii) the desired temporal performance to be achieved under user-specified parametric uncertainties. Based on the decoupling feature of the spatial and temporal frequency elements, CD-MPC tuning and design can be realized separately. In the spatial tuning portion of the algorithm, CD-MPC weighting matrices $S_{b,j}$ are appropriately designed so that harmful high-frequency elements in each actuator profile are suppressed. In the temporal tuning portion of the algorithm, a multivariable temporal filter is employed to smooth reference trajectories for all outputs, and an automated tuning algorithm is used to adjust the filter parameters to achieve pre-specified performance indices.

Note that there is often unavoidable model-plant mismatch between the modeled behavior of an industrial process and its actual behavior, which makes spatial and temporal tuning more difficult. For example, the model parameters of CD processes may be identified via bump test experiments and are normally subject to model uncertainties. Moreover, geometric misalignment between CD actuators and measurement sensors (which could be caused by web wandering and shrinkage) also results in some nonlinear uncertainties to system models utilized in CD model-based controllers. The spatial and temporal tuning algorithms described below are therefore designed to be robust against model parameter uncertainties. As described in more detail below, given a system model and user-specified parametric uncertainties, the weighting matrices $S_{b,j}$ and the corresponding weights can be automatically designed so that robust stability is guaranteed and improved performance is achieved.

Example Problem Statement

Figure 3:
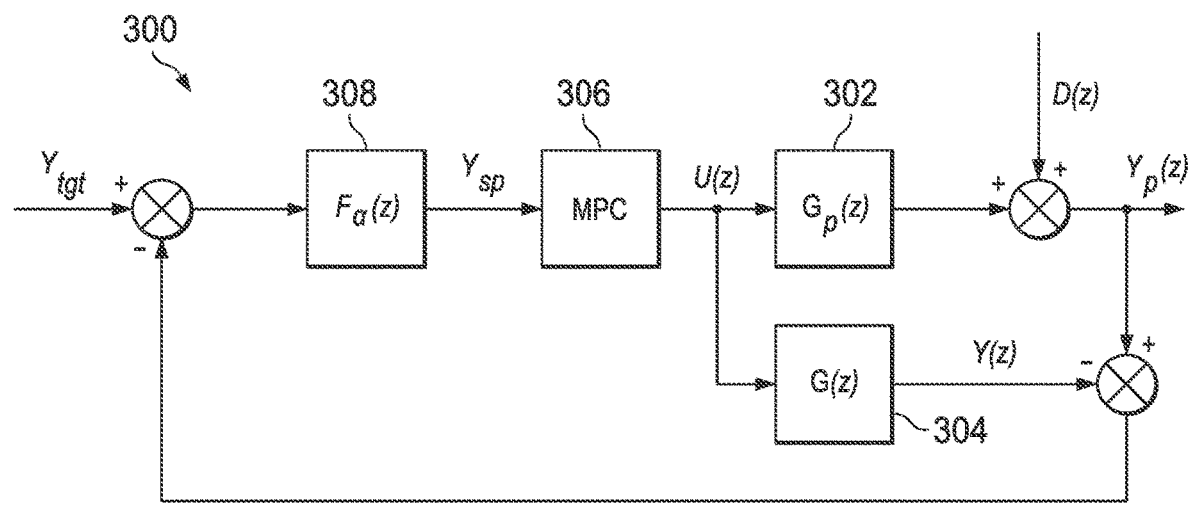
FIG. 3 illustrates an example representation of closed-loop control of a web manufacturing or processing system or other system according to this disclosure.

FIG. 3 illustrates an example representation 300 of closed-loop control of a web manufacturing or processing system or other system according to this disclosure. More specifically, the representation 300 illustrates closed-loop CD control of a web manufacturing or processing system having multiple CD arrays. In FIG. 3, a process 302 (denoted $G_p(z)$) represents the actual industrial process having the CD arrays, and a nominal model 304 (denoted $G(z)$) represents the nominal or modeled behavior of the same industrial process. As noted above, there is often some mismatch between the behavior of the actual process 302 and the modeled behavior defined by the model 304. The representation 300 also includes a model-based controller 306 (in this example an MPC controller) and a temporal filter 308 (denoted $F_a(z)$). The controller 306 could represent the controller 104 in FIG. 1.

Various signals are shown in FIG. 3, including an output target $Y_{tgt}$, a reference trajectory $Y_{sp}$, an actuator profile $U(z)$, a disturbance profile $D(z)$, and a measurement profile $Y_p(z)$. The measurement profile $Y_p(z)$ denotes actual process variable measurements associated with the process 302, such as measurements of one or more characteristics across the web 108. These measurements may differ from a modeled or expected measurement profile $Y(z)$ generated using the model 304. The output target $Y_{tgt}$ denotes the desired value(s) of the measurement profile. The reference trajectory $Y_{sp}$ denotes the difference between the output target and the measurement profile as modified by the temporal filter 308. The actuator profile $U(z)$ denotes the outputs of the controller 306 that are provided to the actuators, such as control signals that cause the actuators to change the process 302. The actuator profile is designed to cause the measurement profile to move toward the output target or to maintain the measurement profile at the output target. The disturbance profile $D(z)$ denotes noise or other disturbances that affect control of the process 302.

In some embodiments, the nominal model 304 can be expressed as:

$$Y(z) = G(z)U(z) + D(z), \; G(z) = \begin{bmatrix} G_{11}h_{11}(z) & \cdots & G_{1N_u}h_{1N_u}(z) \\ \vdots & \ddots & \vdots \\ G_{N_y 1}h_{N_y 1}(z) & \cdots & G_{N_y N_u}h_{N_y N_u}(z) \end{bmatrix} \quad (1)$$

Here:

$$Y(z) = \left[ y_1^T(z), \ldots, y_{N_y}^T(z) \right]^T, \; y_i(z) \in C^{m_i} \quad (2)$$

$$U(z) = \left[ u_1^T(z), \ldots, u_{N_u}^T(z) \right]^T, \; u_j(z) \in C^{n_j} \quad (3)$$

$$D(z) = \left[ d_1^T(z), \ldots, d_{N_y}^T(z) \right]^T, \; d_i(z) \in C^{m_i} \quad (4)$$

$$G_{ij} \in R^{m_i \times n_j}, \; h_{ij}(z) = \frac{(1 - a_{ij})z^{-T_{d_{ij}}}}{1 - a_{ij}z^{-1}} \quad (5)$$

$$i = 1, \ldots, N_y, \; j = 1, \ldots, N_u \quad (6)$$

$N_y$ and $N_u$ are the numbers of controlled CD web properties and CD actuator beams, respectively, and m, and $n_j$ indicate the dimensions of the subsystem from the $j^{th}$ actuator beam $u_j$ to the $i^{th}$ measurement profile $y_i$. Also, $G_{ij}$ represents the subsystem's spatial interaction matrix from $u_j$ to $y_i$, and $h_{ij}$ represents the subsystem's temporal responses from $u_j$ to $y_i$. In addition, $a_{ij}$ and $T_{d_{ij}}$ are the time constant and delay in the discretized form, respectively.

The spatial interaction matrix $G_{ij}$ can have the following parameterized structure:

$$G_{ij} = [g_{1ij}, \ldots, g_{n_jij}] \in R^{m_i \times n_j} \quad (7)$$

where:

$$g_{kij} = f(x, \gamma_{ij}, \eta_{ij}, \xi_{ij}, \beta_{ij}, c_{kij}) = \quad (8)$$

$$\frac{\gamma_{ij}}{2} \left\{ e^{-\frac{\eta_{ij}(x-c_{kij}+\beta_{ij}\xi_{ij})^2}{\xi_{ij}^2}} \cos\left[\frac{\pi(x-c_{kij}+\beta_{ij}\xi_{ij})}{\xi_{ij}}\right] + \right.$$

$$\left. e^{-\frac{\eta_{ij}(x-c_{kij}-\beta_{ij}\xi_{ij})^2}{\xi_{ij}^2}} \cos\left[\frac{\pi(x-c_{kij}-\beta_{ij}\xi_{ij})}{\xi_{ij}}\right] \right\}$$

$$x = 1, \ldots, m_i, k = 1, \ldots, n_j$$

Here, $\gamma_{ij}$, $\eta_{ij}$, $\xi_{ij}$, and $\beta_{ij}$ are gain, attenuation, width, and divergence parameters, respectively, and are employed to characterize a spatial response of each specific actuator. Given the $k^{th}$ actuator, $c_{kij}$ is an alignment parameter that locates the center of the corresponding spatial response.

As noted above, mismatch often exists between the behavior of the actual process 302 and the modeled behavior defined by the model 304. Here, it is assumed that the actual process 302 can be characterized by a parametric perturbation of the nominal model 304 in Equation (1). At the same time, parametric uncertainties are often easy to understand and specify by end users, such as users in the pulp and paper industry. The actual process $G_p$ can then be described as follows.

$$G_p(z) = \begin{bmatrix} G_{11}^P h_{11}^P(z) & \cdots & G_{1N_u}^P h_{1N_u}^P(z) \\ \vdots & \ddots & \vdots \\ G_{N_y1}^P h_{N_y1}^P(z) & \cdots & G_{N_yN_u}^P h_{N_yN_u}^P(z) \end{bmatrix} \quad (9)$$

$$G_{ij}^P = [g_{1ij}^P, \ldots, g_{n_jij}^P] \quad (10)$$

$$g_{kij}^P = f(x, \gamma_{ij}^P, \eta_{ij}^P, \xi_{ij}^P, \beta_{ij}^P, c_{kij}^P) \quad (11)$$

$$\gamma_{ij}^P = (1 + r_{ij}^\gamma)\gamma_{ij}, \eta_{ij}^P = (1 + r_{ij}^\eta)\eta_{ij} \quad (12)$$

$$\xi_{ij}^P = (1 + r_{ij}^\xi)\xi_{ij}, \beta_{ij}^P = (1 + r_{ij}^\beta)\beta_{ij} \quad (13)$$

$$c_{kij}^P = c_{kij} + \varepsilon_{ij} \quad (14)$$

$$h_{ij}^P(z) = \frac{(1-a_{ij}^P)z^{-T_{d_{ij}}}}{1-a_{ij}^P z^{-1}} \quad (15)$$

$$a_{ij}^P = (1 + r_{ij}^a)a_{ij}, T_{d_{ij}}^P = (1 + r_{ij}^{T_d})T_{d_{ij}} \quad (16)$$

$$k = 1, \ldots, n_j, x = 1, \ldots, m_i, i = 1, \ldots, N_y, j = 1, \ldots, N_u \quad (17)$$

where:
The values $r_{ij}^\gamma \in [\underline{r}_{ij}^\gamma, \overline{r}_{ij}^\gamma]$, $r_{ij}^\eta \in [\underline{r}_{ij}^\eta, \overline{r}_{ij}^\eta]$, $r_{ij}^\xi \in [\underline{r}_{ij}^\xi, \overline{r}_{ij}^\xi]$, $r_{ij}^\beta \in [\underline{r}_{ij}^\beta, \overline{r}_{ij}^\beta]$, $r_{ij}^a \in [\underline{r}_{ij}^a, \overline{r}_{ij}^a]$, $r_{ij}^{T_d} \in [\underline{r}_{ij}^{T_d}, \overline{r}_{ij}^{T_d}]$, and $$\varepsilon_{ij} \in \left[-\underline{\varepsilon}_{ij}\frac{m_i}{n_j}, \overline{\varepsilon}_{ij}\frac{m_i}{n_j}\right]$$

and characterize the parametric uncertainties. These trust ranges are also denoted as $\gamma_{ij}^P \in [\underline{\gamma}_{ij}, \overline{\gamma}_{ij}]$, $\eta_{ij}^P \in [\underline{\eta}_{ij}, \overline{\eta}_{ij}]$, $\xi_{ij}^P \in [\underline{\xi}_{ij}, \overline{\xi}_{ij}]$, $\beta_{ij}^P \in [\underline{\beta}_{ij}, \overline{\beta}_{ij}]$, $\alpha_{ij}^P \in [\underline{\alpha}_{ij}, \overline{\alpha}_{ij}]$, and $T_{d_{ij}}^P \in [\underline{T}_{d_{ij}}, \overline{T}_{d_{ij}}]$ for brevity. Since $\varepsilon_{ij}$ affects all $c_{kij}^P$ (where $k = 1, \ldots, n_j$), then $\varepsilon_{ij} \in [\underline{\varepsilon}_{ij}, \overline{\varepsilon}_{ij}]$ represents the trust range of the alignment parameter. Therefore, a set of perturbed models can be characterized by the uncertain model parameters $\gamma_{ij}^P$, $\eta_{ij}^P$, $\xi_{ij}^P$, $\beta_{ij}^P$, $\varepsilon_{ij}$, $\alpha_{ij}^P$, and $T_{d_y}^P$.

An optimal control problem to be used by the controller 306 could therefore be defined as:

$$\min_{\Delta U(k)} \{ \sum_{i=1}^{H_p} (\hat{Y}(k+i) - Y_{sp}(k+i))^T Q_1 (\hat{Y}(k+i) - Y_{sp}(k+i)) + \sum_{i=0}^{H_u-1} [\Delta U(k+i)^T Q_2 \Delta U(k+i) + (U(k+i) - U_{sp}(k+i))^T Q_3 (U(k+i) - U_{sp}(k+i)) + U(k+i)^T Q_4 U(k+i)] \} \quad (18)$$

which is subject to system dynamics and the following constraint:

$$\Omega \Delta U(k) \leq b - \Gamma U(k-1) \quad (19)$$

where:

$$\Delta U(k) = U(k) - U(k-1) \quad (20)$$

$$\hat{Y} \in R^{\sum_{i=1}^{N_y} m_i}$$

represents the output prediction, $$Y_{sp} \in R^{\sum_{i=1}^{N_y} m_i}$$

are the setpoints for the controlled properties, and $H_p$ is the prediction horizon.

$$Q_1 \in R^{\sum_{i=1}^{N_y} m_i \times \sum_{i=1}^{N_y} m_i}$$

is the diagonal penalty matrix for controlled variables, $$Q_2 \in R^{\sum_{j=1}^{N_u} n_j \times \sum_{j=1}^{N_u} n_j}$$

is the diagonal penalty matrix for changes in manipulated variables, and $$Q_3 \in R^{\sum_{j=1}^{N_u} n_j \times \sum_{j=1}^{N_u} n_j}$$

is the penalty matrix for differences between the manipulated variables and their references. More specifically, $Q_1$, $Q_2$, and $Q_3$ can have the following form.

$$Q_1 = \text{diag}(q_{11}I_{m_1}, q_{12}I_{m_2}, \ldots, q_{1N_y}I_{m_{N_y}}) \quad (21)$$

$$Q_2 = \text{diag}(q_{21}I_{n_1}, q_{22}I_{n_2}, \ldots, q_{2N_u}I_{n_{N_u}}) \quad (22)$$

$$Q_3 = \text{diag}(q_{31}I_{n_1}, q_{32}I_{n_2}, \ldots, q_{3N_u}I_{n_{N_u}}) \quad (23)$$

where diag($X_1, X_2, \ldots, X_N$) denotes a block diagonal matrix with diagonal elements $X_1, X_2, \ldots, X_N$. $I_m$ is the m-by-m identity matrix, and $q_{1i}$ (where $i=1, \ldots, N_y$) and $q_{kj}$ (where $k=2, 3$ and $j=1, \ldots, N_u$) are the scalar weights. Q4 is a weighting matrix on actuator bending/picketing and can have the following form:

$$Q_4 = \text{diag}(q_{41}S_{b,1}^T S_{b,1} q_{42}S_{b,2}^T S_{b,2}, \ldots, q_{4N_u}S_{b,N_u}^T S_{b,N_u}) \tag{24}$$

where:

$$S_{b,j} = \begin{bmatrix} -1 & 1 & 0 & \cdots & \cdots & \cdots & 0 \\ 1 & -2 & 1 & \ddots & \ddots & \ddots & \vdots \\ 0 & 1 & -2 & \ddots & \ddots & \ddots & \vdots \\ \vdots & \ddots & \ddots & \ddots & \ddots & \ddots & \vdots \\ \vdots & \ddots & \ddots & \ddots & -2 & 1 & 0 \\ \vdots & \ddots & \ddots & \ddots & 1 & -2 & 1 \\ 0 & \cdots & \cdots & \cdots & 0 & 1 & -1 \end{bmatrix} \tag{25}$$

Here, $q_{4j}$ (where $j=1, \ldots, N_u$) are scalar weights and $S_{b,j} \in \mathbb{R}^{n_j \times n_j}$ is the bending moment matrix with appropriate dimension for each actuator profile. Note that, for each actuator profile, the first- and second-order derivatives are incorporated in $S_{b,j}$, so that the bending behavior is penalized in the cost function of the controller 306. Q, Γ, and b are constraint matrices (vectors) determined based on physical limitations of the actual process 302.

For a single-array CD-MPC controller, a temporal filter 308 (such as one designed in accordance with U.S. patent application Ser. No. 15/273,702, which is hereby incorporated by reference in its entirety) can be utilized to smooth the reference trajectory. However, in a multiple-array CD control systems, there is more than one web property, and each property can have its own importance and satisfaction level. Thus, a specific temporal filter 308 can be introduced for each measurement profile. For measurement profile $y_i(k)$, the filtered trajectory can be expressed as:

$$Y_{sp,i}(k) = F_{\alpha_i}(y_{tgt,i}(k) - d_i(k)), \quad i=1, \ldots, N_y \tag{26}$$

Here, $y_{tgt,i}(k)$ is the output target, and $d_i(k) = y_{p,i}(k) - \hat{y}_i(k)$ is the disturbance estimated based on the process output $Y_p(k)$ and predicted output $\hat{Y}(k)$. $F_{\alpha_i}$ is the time-domain implementation of $f_{\alpha_i}(z)$ based on $y_{sp,i}(z) = f_{\alpha_i}(z)(y_{tgt,i}(z))(y_{tgt,i}(z) - d_i(z))$, and $f_{\alpha_i}(z)$ is the temporal filter defined as:

$$f_{\alpha_i}(z) = \frac{(1 - a_i^r)z^{-T_{d_i}^r}}{1 - a_i^r z^{-1}} \tag{27}$$

where $$a_i^r = e^{-\frac{\Delta T}{\alpha_i \tau_i}}$$

and $\Delta T$ is the sampling time. Note that the parameters $\tau_i$ and $T_{d_i}^r$ are normally designed based on the time constant and delay of the dominant or primary subsystem for the $i^{th}$ measurement profile. This is done in order to make the temporal property of the closed-loop system dependent on that of the dominant or primary open-loop temporal response of the system. Based on this, the temporal filter 308 in FIG. 3 can be constructed based on a diagonal structure of $f_{\alpha_i}(z)$ (where $i=1, \ldots, N_y$) to generate the references for all measurement profiles simultaneously.

In actual practice, when there are fluctuations in the measurement profiles, it may be necessary or desirable for the CD control system to respond quickly in order to minimize the fluctuations. At the same time, it may be necessary or desirable for the control actuators to not be moved aggressively. This can be realized by appropriately adjusting the parameter(s) a, in each temporal filter with the value of $Q_2$ fixed.

In the actual implementation of a multiple-array CD-MPC control system, the optimal control signal could be obtained by solving a constrained quadratic programming (QP) optimization problem for which no explicit solution usually exists. To facilitate theoretical analysis, it is possible to exploit the unconstrained QP problem as in Fan et al., "Two-dimensional frequency analysis for unconstrained model predictive control of cross-direction processes," *Automatica*, vol. 40, no. 11, November 2004, pp. 1891-1903 (which is hereby incorporated by reference in its entirety) to provide a tuning guide for the parameters.

Figure 4:
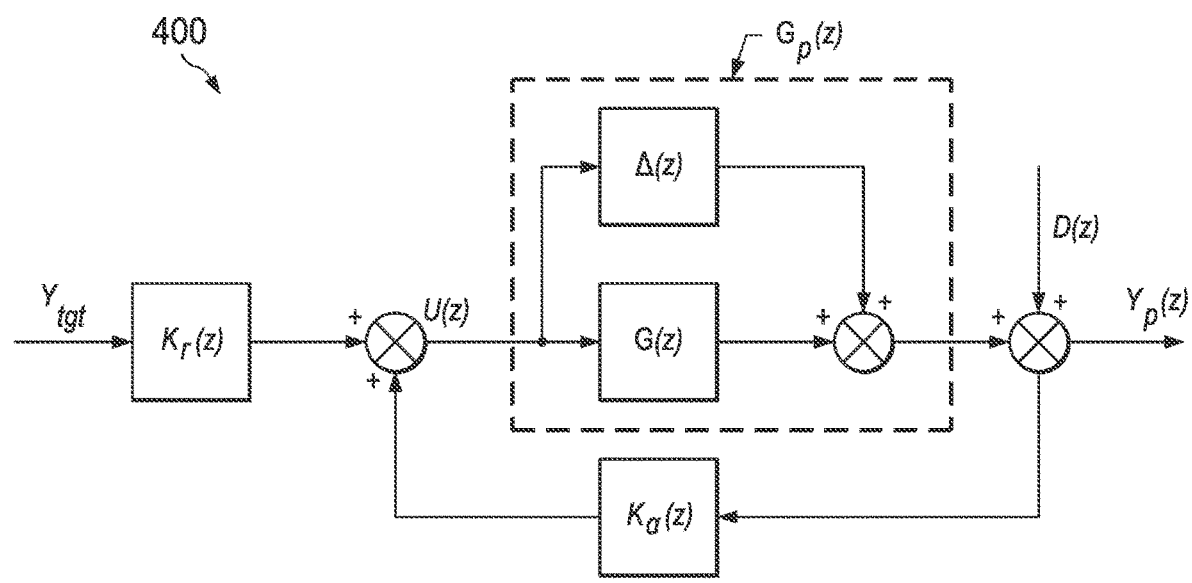
FIG. 4 illustrates another example representation of closed-loop control of a web manufacturing or processing system or other system according to this disclosure.

To this end, the representation 300 shown in FIG. 3 can be rearranged as shown in FIG. 4. FIG. 4 illustrates another example representation 400 of closed-loop control of a web manufacturing or processing system or other system according to this disclosure. In FIG. 4, $K_r(z)$ and $K_d(z)$ are derived and reformulated based on the explicit solution of the unconstrained CD-MPC problem. Note that as the unconstrained MPC problem is exploited, the resultant closed-loop system is linear. In FIG. 4, the actual process $G_p(z)$ could be represented as follows:

$$G_p(z) = G(z) + \Delta(z) \tag{28}$$

in which $\Delta(z)$ denotes the model uncertainty.

Similar to the single-array CD-MPC form, robust stability of the multiple-array case can also be analyzed using the small gain theorem. Specifically, given the parametric uncertainties specified in Equations (10)-(17), the closed-loop system in FIG. 4 remains robustly stable for every $G_p(z)$ when it is nominally stable, and:

$$\|T_{ud}(z)\Delta(z)\|_\infty < 1 \rightarrow \overline{\sigma}(T_{ud}(e^{i\omega})\Delta(e^{i\omega})) < 1, \forall \omega \tag{29}$$

$$T_{ud}(z) = K_d(z)[I - G(z)K_d(z)]^{-1} \tag{30}$$

Here, $\overline{\sigma}(A)$ denotes the maximum singular value of matrix A, and $\Delta(z)$ is the model uncertainty in Equation (28). Also, $$T_{ud}(z) \in \mathbb{C}^{\sum_{j=1}^{N_u} n_j \times \sum_{i=1}^{N_y} m_i}$$

is the sensitivity function from the disturbance profile D(z) to the input profile U(z) at the nominal case.

In addition to the basic requirement that the closed-loop system be stable, the multiple-array CD-MPC controller that is designed here aims to optimize performance in terms of reduced fluctuations of measurement profiles, suppressed high-frequency picketing of actuators, and avoidance of aggressive behavior of the actuators. These performances can be reflected in the closed-loop transfer functions $T_{ud}(z)$ in Equation (29) and $T_{yd}(z)$ as follows:

$$T_{yd}(z) = [I - G(z)K_d(z)]^{-1} \tag{31}$$

where $$T_{yd}(z) \in \mathbb{C}^{\sum_{i=1}^{N_y} m_i \times \sum_{i=1}^{N_y} m_i}.$$

In the following discussion, the transfer functions $T_{ud}(z)$ and $T_{yd}(z)$ are used extensively in the design and tuning procedure of the controller parameters.

Given the multiple-array CD-MPC system shown in FIG. 3, the objectives of controller tuning can include ensuring that the closed-loop system in FIG. 3 is robustly stable, the steady-state variation of the measurement profiles is minimized, and temporal performance indices (such as 2σ settling times and overshoots) satisfy the end users' specifications. In the multiple-array CD-MPC system shown in FIG. 3, the closed-loop system behavior is affected by the following parameters: the matrices $Q_1$ to $Q_4$, the temporal filter parameters $\alpha_i$ (where i=1, ..., $N_y$), the prediction horizon $H_p$, and the control horizon $H_u$. In some embodiments, the prediction horizon $H_p$ is selected to be four times the summation of the largest time constant and delay within all subsystems. Also, in some embodiments, the control horizon $H_u=1$ can be utilized in large-scale MPC (although it can be increased based on practical situations), and $Q_1$ is often fixed in robust tuning. Consequently, only $Q_3$, $Q_4$, and $\alpha_i$ (where i=1, ..., $N_y$) are the tuning parameters used below. Given these tuning parameters, a two-dimensional frequency-domain analysis can be performed first to simplify the tuning problem by decoupling the tuning procedure into spatial tuning and temporal tuning.

Two-Dimensional Frequency-Domain Analysis

Given a multiple-array CD system G(z), if all subsystems $G_{ij}(z)$ are rectangular circulant matrices (RCMs), the nominal plant G(z) itself is a block rectangular circulant matrix. This can be transformed into the two-dimensional frequency-domain via:

$$\{g(v_0, z), \ldots, g(v_{k_{max}}, z)\} = \text{Diag}(P_y F_y G(z) F_u^H P_u^T) \tag{32}$$

Here, $g(v_k, z) \in C^{N_y \times N_u}$ denotes the transfer function G(z) at a given spatial frequency $v_k$ and can be represented as:

$$g(v_k, z) = \begin{bmatrix} g_{11}(v_k, z) & \cdots & g_{1N_u}(v_k, z) \\ \vdots & \ddots & \vdots \\ g_{N_y 1}(v_k, z) & \cdots & g_{N_y N_u}(v_k, z) \end{bmatrix} \tag{33}$$

$$P_y \in R^{\sum_{i=1}^{N_y} m_i \times \sum_{i=1}^{N_y} m_i} \text{ and } P_u \in R^{\sum_{i=1}^{N_u} n_i \times \sum_{i=1}^{N_u} n_i}$$

are unitary permutation matrices. Also, $F_y$ and $F_u$ are block diagonal matrices as follows:

$$F_y = \text{diag}(F_{m_1}, \ldots, F_{m_{N_y}}), F_u = \text{diag}(F_{n_1}, \ldots, F_{n_{N_u}}) \tag{34}$$

where $F_{m_i} \in C^{m_i \times m_i}$ and $F_{n_j} \in C^{n_j \times n_j}$ are complex Fourier matrices. "Diag(A)" denotes the operation of obtaining the (block) diagonal part of A, and $k_{max}$ in $v_{k_{max}}$ indicates the spatial actuator Nyquist frequency.

Given the block rectangular circulant property of G(z), the sensitivity functions $T_{yd}(z)$ and $T_{ud}(z)$ in Equations (29) and (31) are also block rectangular circulant matrices. Therefore, the transfer functions $T_{yd}(z)$ and $T_{ud}(z)$ can be transformed into the two-dimensional frequency-domain via:

$$\{t_{yd}(v_0, z), \ldots, t_{yd}(v_{k_{max}}, z)\} = \text{Diag}(P_y F_y T_{yd}(z) F_y^H P_y^T) \tag{35}$$

$$\{t_{ud}(v_0, z), \ldots, t_{ud}(v_{k_{max}}, z)\} = \text{Diag}(P_u F_u T_{ud}(z) F_y^H P_y^T) \tag{36}$$

where $t_{yd}(v_k, z) \in C^{N_y \times N_y}$ and $t_{ud}(v_k, z) \in C^{N_u \times N_y}$ denote the two-dimensional form of transfer functions $T_{yd}(z)$ and $T_{ud}(z)$ at spatial frequency $v_k$. These values can be represented as:

$$t_{yd}(v_k, z) = \begin{bmatrix} t_{yd11}(v_k, z) & \cdots & t_{yd1N_y}(v_k, z) \\ \vdots & \ddots & \vdots \\ t_{ydN_y1}(v_k, z) & \cdots & t_{ydN_yN_y}(v_k, z) \end{bmatrix} \tag{37}$$

$$t_{ud}(v_k, z) = \begin{bmatrix} t_{ud11}(v_k, z) & \cdots & t_{ud1N_y}(v_k, z) \\ \vdots & \ddots & \vdots \\ t_{udN_u1}(v_k, z) & \cdots & t_{udN_uN_y}(v_k, z) \end{bmatrix} \tag{38}$$

The analysis of the closed-loop CD system properties can be performed in the two-dimensional frequency-domain through $t_{yd}(v_k, z)$ and $t_{ud}(v_k, z)$. As a result, controller tuning can be split into (i) spatial tuning (at z=1) with $Q_3$ and $Q_4$ and (ii) temporal tuning (at v=0) with $\alpha_i$ (where i=1, ..., $N_y$).

Spatial Tuning for Multiple-Array CD-MPC

In the spatial tuning portion of the multiple-array CD-MPC tuning algorithm, the target is to adjust weights:

$$Q_3 = \text{diag}(q_{31} I_{n_1}, \ldots, q_{3N_u} I_{n_{N_u}}) \tag{39}$$

$$Q_4 = \text{diag}(q_{41} S_{b,1}^T S_{b,1}, \ldots, q_{4N_u} S_{b,N_u}^T S_{b,N_u}) \tag{40}$$

to achieve robust stability and to reduce the spatial variability of the measurement profiles. The penalty matrices $S_{b,j}$ (where j=1, ..., $N_u$) are first tuned based on the spatial frequency properties of the process 302, and then a systematic tuning algorithm is used to adjust the scalar weights $q_{3j}$ and $q_{4j}$ (where j=1, ..., $N_u$).

In conventional multiple-array CD-MPC systems, all $S_{b,j}$ may be fixed to the same constant matrix shown in Equation (25), without taking the specific characteristics of the CD process into consideration. Here, two systematic approaches are described to design the matrices $S_{b,j}$ (where j=1, ..., $N_u$) so that the spatial spectrum of all actuator profiles can be shaped according to the frequency response of the given CD system. Note that the Discrete Fourier Transform (DFT) is utilized here to obtain the spatial frequency representation of a spatial signal, although other transforms could be used. More specifically, the spatial frequency representation of a signal $y \in C^m$ can be calculated by:

$$\check{y} = F_m \cdot y \tag{41}$$

where $F_m$ is the Fourier matrix. Based on this, the following (Lemma 1) can be proved. Given spatial signals $y \in C^m$ and $u \in C^n$ and assuming $N \in C^{m \times n}$ is an RCM, if y=N·u, then:

$$\check{y} = \check{N} \cdot \check{u} \tag{42}$$

where $\check{N} = F_m N F_n$. It is worth noting that if N is a constant RCM, $\check{N}$ in Equation (42) indicates the spatial frequency-domain representation of N.

In the multiple-array CD-MPC cost function, the $Q_4$ penalty term can be expressed as:

$$U(k)^T Q_4 U(k) = [u_1^T(k), \ldots, u_{N_u}^T(k)] \cdot \tag{43}$$

$$\begin{bmatrix} q_{41} S_{b,1}^T S_{b,1} & 0 & 0 \\ 0 & \ddots & 0 \\ 0 & 0 & q_{4N_u} S_{b,N_u}^T S_{b,N_u} \end{bmatrix} \cdot \begin{bmatrix} u_1(k) \\ \vdots \\ u_{N_u}(k) \end{bmatrix}$$

$$= \sum_{j=1}^{N_u} (S_{b,j} u_j(k))^T q_{4j}(S_{b,j} u_j(k))$$

Based on this, it can be seen that each $S_{b,j}$ only affects a specific actuator profile $u_j$. Since each $u_j$ may relate to several measurement profiles, it may be desirable that the design of $S_{b,j}$ take the spatial frequency properties of all corresponding subsystems $G_{ij}$ (where i=1, . . . , $N_y$) into consideration. To characterize each of the subsystems $G_{ij}$, assume the maximum gain of the spatial frequency response of a single-array CD process is $g_{max}$. The cutoff frequency $v_c$ of a process is the spatial frequency at which the following holds:

$$g_{v_c} = r \cdot g_{max}, \quad r \in (0, 0.5] \tag{44}$$

In some embodiments, r=0.1. It is known that actuation beyond the cutoff frequency can be harmful to a single-array CD process.

Since each subsystem $G_{ij}$ in the plant G can be viewed as a single-array process, it is ideal that the matrices $S_{b,j}$ can penalize the frequency components in $u_j$ that are within the union of the undesired frequency regions of all subsystems $G_{ij}$. In order to achieve this, the matrices $S_{b,j}$ can be designed as a high-pass spatial filter with a passband $v_{b,j}$ equal to:

$$v_{b,j} = \min(v_c(G_{1j}), \ldots, v_c(G_{N_yj})), j=1, \ldots, N_u \tag{45}$$

where $v_c(G_{ij})$ indicates the cutoff frequency of $G_{ij}$. Based on the results above, such a $S_{b,j}$ can put almost zero weights below $v_{b,j}$ and large weights above $v_{b,j}$ so that actuation beyond the cutoff frequency can be reduced or eliminated through the MPC optimization. In this approach, the weighting matrices $S_{b,j}$ can be identified as follows.

| Algorithm 1 Design $S_{b,j}$, j = 1,...,$N_u$ as high pass FIR filters with the stop bands that equal $v_{b,j}$, j = 1,...,$N_u$. |
| --- |
| 1:     Input spatial gain matrices $G_{ij}$,i = 1,...,$N_y$,j = 1,...,$N_u$; |
| 2:     for j = 1 : $N_u$ do |
| 3:         Calculate $v_{b,j}$ = min($v_c(G_{1j})$,...,$v_c(G_{Nyj})$); |
| 4:         Design a low pass filter based on the sinc function and the window function with the stop band that equals $v_{b,j}$; |
| 5:         Conduct the inverse Fourier transform to obtain the filter in the spatial domain; |
| 6:         Construct the desired high pass filter $S_{b,j}$ via spectral inversion of the filter obtained in line 4; |
| 7:     end for |
| 8:     Output $S_{b,j}$,j = 1,...,$N_u$; |

Alternatively, the filter length of $S_{b,j}$ is limited by the number of actuators in the $j^{th}$ beam, so a transition band exists in the frequency response of the filter and can be optimized. Given a specific actuator beam, the subsystem with the smallest cutoff frequency is the hardest to control and is referred to as the "worst" subsystem below. Given this, it may be desirable that the spatial frequency response of the designed $S_b$ filter is the mirror of the spatial gains of the worst subsystem. To achieve this, the real valued Fourier matrix $F_n^r \in R^{n \times n}$ can be utilized and defined as:

$$F_n^r(j,k) = \begin{cases} \sqrt{\dfrac{1}{n}} & j = 1 \\ \sqrt{\dfrac{2}{n}} \cdot \sin[(k-1)v_j] & j = 2, \ldots, q \\ \sqrt{\dfrac{2}{n}} \cdot \cos[(k-1)v_j] & j = q+1, \ldots, n \end{cases} \tag{46}$$

where q=(n+1)/2 if n is odd and q=n/2 if n is even. Here, $v_j=2\pi(j-1)/n$ is the spatial frequency.

To achieve the desired $S_b$ filters, the mirrored frequency response is calculated (such as by using a numerical method), and the inverse Fourier transform is implemented with the real valued Fourier matrix introduced above. To guarantee that the obtained $S_{b,j}$ matrices have the RCM structure, the mirrored frequency response can satisfy the following property (Lemma 2). Define $k_m(x)$ (where x= 1, . . . , $n_j$) as the pre-specified spatial frequency response gain of $S_{b,j}$. If $k_m(x) \in R$, $\forall x$ and $k_m(x)=k_m(n_j-x+2)$ (where x=2, . . . , $(n_j+1)/2$ if $n_j$ is odd or x=2, . . . , $n_j/2$ if $n_j$ is even), the $S_{b,j}$ matrices obtained via the inverse real valued Fourier transform is a symmetric real valued circulant matrix. In this approach, the weighting matrices $S_{b,j}$ can be identified as follows.

| Algorithm 2 Design $S_{b,j}$,j = 1,...,$N_u$ based on the mirror of the process spatial spectrum |
| --- |
| 1:     Input spatial gain matrices $G_{ij}$,i = 1,...,$N_y$,j = 1,...,$N_u$; |
| 2:     Input actuator spacings $X_{uj}$,j = 1,...,$N_u$; |
| 3:     for j = 1 : $N_u$ do |
| 4:         $v_b$ = 1/2$X_{uj}$; |
| 5:         for i = 1 : $N_y$ do |
| 6:             Calculate the cut-off frequency $v_{cij}$ of $G_{ij}$, i.e., $v_{cij} = v_c(G_{ij})$; |
| 7:             if $v_{cij} < v_b$ then |
| 8:                 Set $G_b = G_{ij}$ and $v_b = v_{cij}$; |
| 9:             end if |
| 10:        end for |
| 11:        Obtain the desired mirrored spectrum of $G_b$ by numerical methods; |
| 12:        Process the obtained spectrum content based on Lemma 2; |
| 13:        Conduct the inverse Fourier transform with (46) to obtain the weighting matrix $S_{b,j}$ in the spatial domain; |
| 14:     end for |
| 15:     Output $S_{b,j}$,j = 1,...,$N_u$; |

Figure 5:
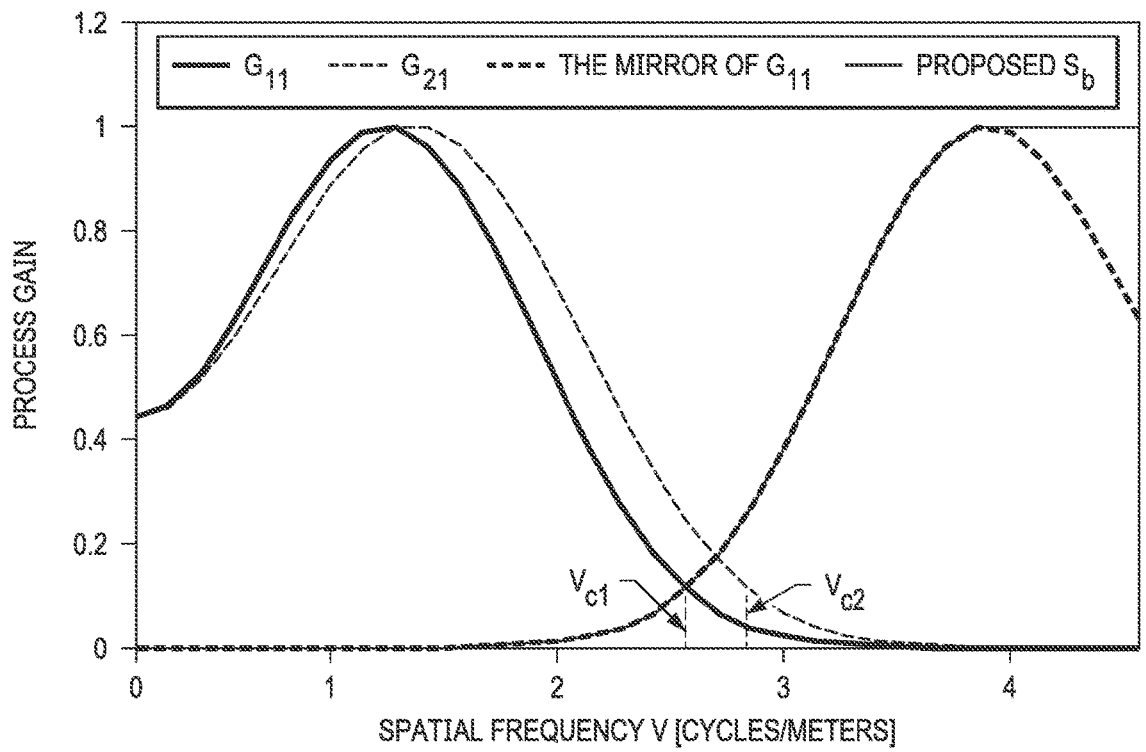
FIG. 5 illustrates example results obtained when identifying weighting matrices as part of a spatial tuning algorithm according to this disclosure.

FIG. 5 illustrates example results obtained when identifying weighting matrices as part of a spatial tuning algorithm according to this disclosure. More specifically, FIG. 5 illustrates example results obtained using Algorithm 2 for a specific actuator beam. In this case, two measurements are affected by the considered actuator beam. Since the subsystem $G_{11}$ has a smaller cutoff frequency, the frequency response of $S_{b,1}$ is designed as the mirror of $G_{11}$.

Using Algorithms 1 and 2, the weighting matrices $S_{b,j}$ are designed based on the nominal model 304, which works well for cases where there is no model-plant mismatch. For cases with model parameter uncertainties, these algorithms can be modified to develop weighting matrices $S_{b,j}$ that are robust over pre-specified parametric uncertainties. In order to ensure robust performance of the proposed $S_b$ matrices, the passband $v_{b,j}$ can be designed based on the smallest cutoff frequency of all possible corresponding subsystems given the pre-specified parametric uncertainties. Thus, given a specific subsystem $G_{ij}$, denote $v_w$, as the smallest cutoff frequency of all possible perturbed models $G_{ij}^P$ defined in Equation (10). The cutoff frequency $v_c$ of a single-array process changes monotonically with respect to all spatial parameters (such as when $v_c$ increases as $\eta$ decreases), so $v_w$, of $G_{ij}$ can be calculated by:

$$\min_{\eta_{ij}^p, \beta_{ij}^p, \gamma_{ij}^p, \xi_{ij}^p, \varepsilon_{ij}^p} v_c(G_{ij}), \quad (47)$$

$$\text{s.t. } \eta_{ij}^p \in \{\underline{\eta}_{ij}, \overline{\eta}_{ij}\}, \beta_{ij}^p \in \{\underline{\beta}_{ij}, \overline{\beta}_{ij}\},$$

$$\gamma_{ij}^p \in \{\underline{\gamma}_{ij}, \overline{\gamma}_{ij}\}, \xi_{ij}^p \in \{\underline{\xi}_{ij}, \overline{\xi}_{ij}\},$$

$$\varepsilon_{ij}^p \in \{\underline{\varepsilon}_{ij}, \overline{\varepsilon}_{ij}\},$$

$$i = 1, \ldots, N_y, j = 1, \ldots, N_u$$

The weighting matrices $S_{b,j}$ can be designed based on Equation (47) and:

$$v_{b,j} = \min(v_w(G_{1j}), \ldots, v_w(G_{N_y j})), j=1, \ldots, N_u \quad (48)$$

Note that the obtained $S_b$ matrices consider the worst-case situation that may occur given the pre-specified model parameter uncertainties. They are therefore robust against possible model-plant mismatch that can exist in practice.

Once the spectrum-based matrices $S_{b,j}$ are developed (in whatever manner), automated tuning can be performed to tune the weights $q_{3j}$ and $q_{4j}$ (where $j=1, \ldots, N_u$). To perform this automated tuning, a general weight $q_f$ (also referred to as a multiplier) is defined, and the original weights $Q_3$ and $Q_4$ can be expressed as:

$$Q_3 = q_f \cdot \mathrm{diag}(r_{31}^t I_{n_1}, \ldots, r_{3N_u}^t I_{n_{N_u}}) \quad (49)$$

$$Q_4 = q_f \cdot \mathrm{diag}(r_{41}^t S_{b,1}^T S_{b,1}, \ldots, r_{4N_u}^t S_{b,N_u}^T S_{b,N_u}) \quad (50)$$

Here, $r_{3j}^t$ and $r_{4j}^t$ (where $j=1, \ldots, N_u$) indicate the relative weights for each CD actuator beam, which could be pre-specified by end users. Given the modified weighting matrices $Q_3$ and $Q_4$ in Equations (49) and (50), the tuning objective here is to adjust the scalar weight $q_f$ to ensure robust stability in the spatial domain with $z=1$.

To aid analysis, steady-state sensitivity functions can be expressed as:

$$T_{yd}(z=1) = \left(I_{\sum_{i=1}^{N_y} m_i} + G_0(Q_3+Q_4)^{-1} G_m^T Q_1\right)^{-1} \quad (51)$$

$$T_{ud}(z=1) = (Q_3+Q_4+G_m^T Q_1 G_0)^{-1} G_m^T Q_1 \quad (52)$$

where:

$$G_0 = \begin{bmatrix} G_{11} & \cdots & G_{1N_u} \\ \vdots & \ddots & \vdots \\ G_{N_y 1} & \cdots & G_{N_y N_u} \end{bmatrix} \quad (53)$$

$$G_m = \begin{bmatrix} G_{m11} & \cdots & G_{m1N_u} \\ \vdots & \ddots & \vdots \\ G_{mN_y 1} & \cdots & G_{mN_y N_u} \end{bmatrix} \quad (54)$$

$$G_{mij} = r_{ij} G_{ij}, r_{ij} = \sum_{k=1}^{H_p - T_{dij}} \sum_{l=1}^{k} a_{ij}^{l-1} \quad (55)$$

$$i = 1, \ldots, N_y, j = 1, \ldots, N_u. \quad (56)$$

Based on the small gain theorem, the robust stability condition at $z=1$ can be represented as:

$$\overline{\sigma}(T_{ud}(1)\Delta(1)) < 1 \quad (57)$$

where $\Delta(1)$ is the additive uncertainty at $z=1$. Given the pre-specified parametric uncertainties, the singular values of $\Delta(1)$ may be difficult to calculate, so an analysis of the uncertainty term can be performed first. Based on the parametric uncertainties in Equations (10)-(17), the uncertain term can be represented as:

$$\Delta(1) = G_p(1) - G(1) = \begin{bmatrix} \Delta_{11}(1) & \cdots & \Delta_{1N_u}(1) \\ \vdots & \ddots & \vdots \\ \Delta_{N_y 1}(1) & \cdots & \Delta_{N_y N_u}(1) \end{bmatrix} \quad (58)$$

where $\Delta_{ij}(1) = G_{ij}^P(1) - G_{ij}(1)$, $i=1, \ldots, N_y$, and $j=1, \ldots, N_u$. Since parametric uncertainties are employed, $G_p(1)$ is also a block diagonal RCM based on the formula used to create the spatial interaction matrix. Thus, $\Delta_{ij}(1)$ (where $i=1, \ldots, N_y$, and $j=1, \ldots, N_u$) are all RCMs based on the property that RCM is closed on the summation operation. It can therefore be transformed into the two-dimensional frequency-domain with:

$$\{\delta(v_0, 1), \ldots, \delta(v_{k_{max}}, 1)\} = \mathrm{Diag}(P_y F_y \Delta(1) F_u^H P_u^T) \quad (59)$$

where $P_y$ and $P_u$ are the unitary permutation matrices and $F_y$ and $F_u$ are block diagonal Fourier matrices as in Equation (34). Also:

$$\delta(v_k, 1) = \begin{bmatrix} \delta_{11}(v_k, 1) & \cdots & \delta_{1N_u}(v_k, 1) \\ \vdots & \ddots & \vdots \\ \delta_{N_y 1}(v_k, 1) & \cdots & \delta_{N_y N_u}(v_k, 1) \end{bmatrix} \quad (60)$$

where $\delta_{ij}(v_k, 1)$ is the spatial frequency representation of $\Delta_{ij}(1)$ at spatial frequency $v_k$, $i=1, \ldots, N_y$, and $j=1, \ldots, N_u$.

Since multiplying a matrix with unitary matrices does not change its singular values, the singular values of $\Delta(1)$ can be represented as:

$$h_2 = [\varepsilon(\delta(v_0, 1), \ldots, \varepsilon(\delta(v_{k_{max}}, 1))] \quad (61)$$

where $\varepsilon(A) = [\overline{\sigma}(A), \ldots, \underline{\sigma}(A)]$ denotes the singular values of A arranged from largest to smallest. If the singular values of $\Delta(1)$ obtained by singular value decomposition (SVD) are:

$$h_1 = \left[\sigma_1(\Delta(1)), \ldots, \sigma_{\sum_{j=1}^{N_u} n_j}(\Delta(1))\right] \quad (62)$$

the following relationship holds:

$$h_1 = P \cdot h_2 \quad (63)$$

where P is a permutation matrix. Based on the above analysis, the singular values of $\Delta(1)$ calculated by $h_2$ are sorted according to the spatial frequencies.

On the other hand, it is also possible to perform a two-dimensional frequency transformation on the sensitivity function $T_{ud}(1)$ with:

$$\{t_{ud}(v_0, 1), \ldots, t_{ud}(v_{k_{max}}, 1)\} = \text{Diag}(P_u F_u T_{ud}(1) F_y^H P_y^T) \quad (64)$$

The robust stability condition in the two-dimensional frequency-domain can then be represented as:

$$\max_k(\overline{\sigma}(t_{ud}(v_k,1))\overline{\sigma}(\delta(v_k,1))) < 1 \quad (65)$$

where $k=0, \ldots, k_{max}$. Note that the robust stability condition constructed based on the two-dimensional frequency approach may be less conservative than the traditional one because it allows a larger peak of $\overline{\sigma}(t_{ud}(v_k, 1))$ and $\overline{\sigma}(\delta(v_k, 1))$ does not occur at the same spatial frequency.

Figure 6:
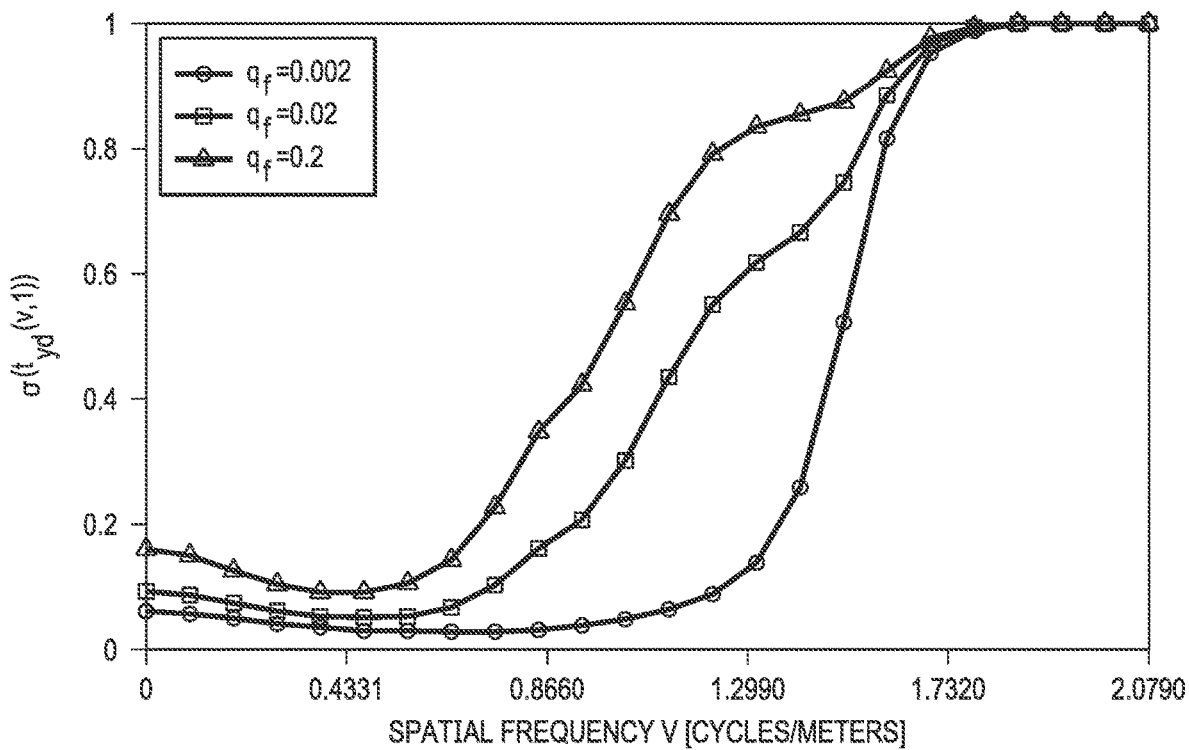
FIGS. 6 and 7 illustrate example effects of changing a general weight on sensitivity functions during spatial tuning according to this disclosure.
Figure 7:
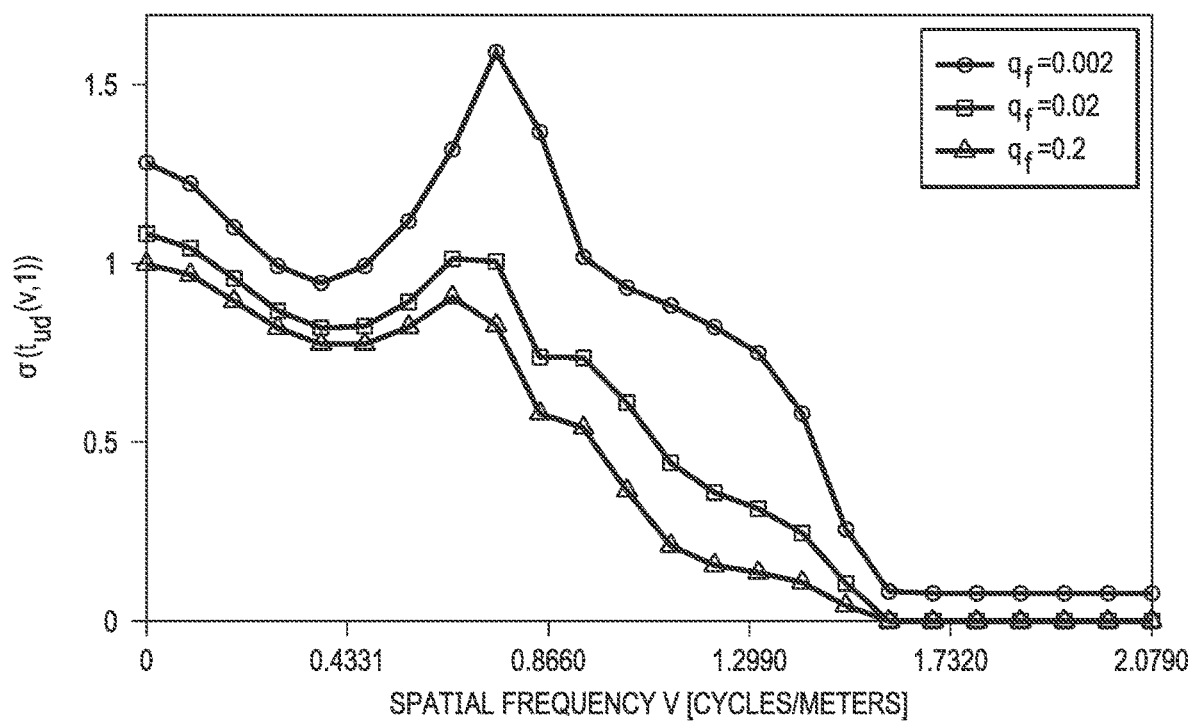

To utilize the condition in Equation (65), the relationship between the tuning parameter (general weight $q_f$) and the sensitivity functions can be analyzed to provide some tuning guidelines. FIGS. 6 and 7 illustrate example effects of changing the general weight $q_f$ on sensitivity functions during spatial tuning according to this disclosure. It can be seen in FIGS. 6 and 7 that a greater $q_f$ gives better robustness while a smaller $q_f$ provides better performance. Therefore, $q_f$ can be tuned according to this relationship given $\overline{\sigma}(\delta(v_j, 1))$, where $j=1, \ldots, k_{max}$. In order to calculate $\overline{\sigma}(\delta(v_j, 1))$ given the parametric uncertainties, the following optimization problem can be solved:

$$\max_{\eta_{ij}^p, \beta_{ij}^p, \gamma_{ij}^p, \xi_{ij}^p, \varepsilon_{ij}^p} \overline{\sigma}(\delta(v_k, 1)), \text{ for } k = 1, \ldots, k_{max}, \quad (66)$$

$$\text{s.t. } \eta_{ij}^p \in \{\underline{\eta}_{ij}, \overline{\eta}_{ij}\}, \beta_{ij}^p \in \{\underline{\beta}_{ij}, \overline{\beta}_{ij}\},$$

$$\gamma_{ij}^p \in \{\underline{\gamma}_{ij}, \overline{\gamma}_{ij}\}, \xi_{ij}^p \in \{\underline{\xi}_{ij}, \overline{\xi}_{ij}\},$$

$$\varepsilon_{ij}^p \in \{\underline{\varepsilon}_{ij}, \overline{\varepsilon}_{ij}\},$$

$$i = 1, \ldots, N_y, j = 1, \ldots, N_u$$

Since the spatial gain matrices $G_{ij}(1)$ and $G_{ij}^P(1)$ can be generated in a highly nonlinear way, it may be very difficult to obtain the analytical expression of $\overline{\sigma}(\delta(v_k, 1))$. However, it has been shown that the maximum singular value of the uncertainty term for a single-array system can be calculated based on only the extreme case system parameters. Since each subsystem of a multiple-array system has the same structure as that of systems previously considered, the problem in Equation (66) can be solved by only considering the boundaries of its constraints. Unfortunately, this approach could be too computationally expensive to employ in some cases since the number of extreme cases to be considered increases exponentially with respect to system dimensions and can be very large even for a small-dimensional system ($2^5$ extreme cases for a 1-by-1 process or $2^{5\times6}$ extreme cases for a 2-by-3 process).

To overcome this issue, define the spatial parameters of a multiple-array CD process in matrix format as follows:

$$b = \begin{bmatrix} b_{11} & \cdots & b_{1N_u} \\ \vdots & \ddots & \vdots \\ b_{N_y 1} & \cdots & b_{N_y N_u} \end{bmatrix} \quad (67)$$

where b represents $\eta$, $\beta$, $\gamma$, $\xi$, or $\varepsilon$. Therefore, similar to characterizing a group of uncertain systems with a polytopic system described by a number of vertex systems, the maximum singular values of $\Delta(1)$ given the parametric uncertainty can be calculated approximately based on:

$$\underline{b} = \begin{bmatrix} \underline{b}_{11} & \cdots & \underline{b}_{1N_u} \\ \vdots & \ddots & \vdots \\ \underline{b}_{N_y 1} & \cdots & \underline{b}_{N_y N_u} \end{bmatrix}, \overline{b} = \begin{bmatrix} \overline{b}_{11} & \cdots & \overline{b}_{1N_u} \\ \vdots & \ddots & \vdots \\ \overline{b}_{N_y 1} & \cdots & \overline{b}_{N_y N_u} \end{bmatrix} \quad (68)$$

Then, the optimization problem in Equation (66) can be solved by:

$$\max_{\eta,\beta,\gamma,\xi,\varepsilon} \overline{\sigma}(\delta(v_k,1)), \text{ for } k=1, \ldots, k_{max},$$

$$\text{s.t. } \eta \in \{\underline{\eta}, \overline{\eta}\}, \beta \in \{\underline{\beta}, \overline{\beta}\},$$

$$\gamma \in \{\underline{\gamma}, \overline{\gamma}\}, \xi \in \{\underline{\xi}, \overline{\xi}\}, \varepsilon \in \{\underline{\varepsilon}, \overline{\varepsilon}\} \quad (69)$$

Note that in the optimization problem of Equation (69), the number of extreme case systems considered is the same as that of the single-array case, which simplifies the problem at hand.

Although the optimality of the approximation in Equation (69) cannot be rigorously proved, it is intuitive in that the maximum singular values $\overline{\sigma}(\delta(v_k, 1))$ at each spatial frequency normally occur when the spatial model parameters reach their extreme uncertain values simultaneously. This is because the largest difference between $G_p$ and G is achieved at this time. The theoretic support behind the aforementioned analysis is that the robust performance of a group of perturbed systems represented as a polytopic system can be characterized by the vertex systems and can particularly be captured via only the set of the extreme-case vertex systems to reduce the computation cost. According to the proposed tuning guideline of $q_f$ as well as the bound of $\overline{\sigma}(\delta(v_k, 1))$ (where $k=1, \ldots, k_{max}$) based on the model uncertainty, a bisection search method or other search method can be utilized to find the smallest $q_f$ to guarantee the condition in Equation (65). This can be accomplished quickly with conventional computing devices.

Note that Equation (14) above defines alignment uncertainty as $c_{kij}^P = c_{kij} + \varepsilon_{ij}$, where $\varepsilon_{ij} \in [\underline{\varepsilon}_{ij}, \overline{\varepsilon}_{ij}]$ is a global uncertainty on all alignment parameters of $G_{ij}^P$. Such a global perturbation corresponds to the so-called "wandering" behavior in which an entire web travels towards one side of a machine. In the paper-making process or other processes, there is another type of misalignment called "shrinkage" in which the sides of a web shrink (such as when water is removed from a paper sheet). This type of alignment uncertainty can be represented as:

$$c_{kij}^P = c_{kij} + s_{kij} \quad (70)$$

where $s_{kij}$ is the shrinkage for the $k^{th}$ alignment. Denote $s_{ij} = [s_{1ij}, \ldots, s_{n_j ij}]$ as the shrinkage profile. In some embodiments, the $s_{ij}$ values can be specified by low shrinkage width, low shrinkage, high shrinkage, and high shrinkage width. It has been observed that the worst situation happens when the largest shrinkage is reached at both sides (denoted as $s_{ij}^b$) or only at one side (denoted as $s_{ij}^o$). The proposed spatial tuning approaches above can be modified to add constraints $s_{ij} \in \{s_{ij}^b, s_{ij}^o\}$ to the optimization problems in Equation (47) and (66) when users believe that nonlinear shrinkage will be significant.

Temporal Tuning for Multiple-Array CD-MPC

In the temporal tuning portion of the multiple-array CD-MPC tuning algorithm, the objective is to determine the parameters $\alpha_i$ (where $i=1, \ldots, N_y$) (also denoted as $\alpha \triangleq$

[$\alpha_1, \ldots, \alpha_{N_y}$] below) in the temporal filter(s) 308 such that robust stability and user-specified temporal performance can be achieved. The robust stability condition at v=0 can be obtained similar to that in the spatial tuning portion of the algorithm and is denoted as:

$$\bar{\sigma}(t_{ud}(0,e^{i\omega}))\bar{\sigma}(\delta(0,e^{i\omega}))<1, \forall \omega \quad (71)$$

where $t_{ud}(0, e^{i\omega}) \in C^{N_u \times N_y}$ and $\delta(0, e^{i\omega}) \in C^{N_y \times N_u}$ are $T_{ud}(z)$ an $d\Delta(z)$ at spatial frequency v=0.

Since extreme closed-loop system behavior normally occurs at the extreme model parameters, the maximum of $\bar{\sigma}(\delta(0, e^{i\omega}))$ can be calculated by solving:

$$\max_{\alpha^p, T_d^p} \bar{\sigma}(\delta(0, e^{i\omega})), \forall \omega, \quad (72)$$

$$\text{s.t. } a^p \in \{\bar{a}, \underline{a}\}, T_d^p \in \{\bar{T}_d, \underline{T}_d\}$$

Here, $\alpha^p$ and $T_d^p$ represent the temporal parameter matrices that include $\alpha_{ij}^p$ and $T_{d_{ij}}^p$ (where i=1, ..., $N_y$ and j=1, ..., $N_u$) in the same manner as in Equation (67). Also, $\{\bar{\alpha}, \underline{\alpha}\}$ and $\{\bar{T}_d, \underline{T}_d\}$ indicate that all elements in $\alpha^p$ and $T_d^p$ take their maximum and minimum values in the uncertain regions simultaneously, similar to Equation (68).

For robust stability analysis, a general weight $\alpha^b$ can be adopted such that $\alpha^1 = \ldots = \alpha^{N_y} = \alpha^b$, and a search can be conducted to identify the smallest $\alpha^b$ that satisfies Equation (71). This can be achieved efficiently, such as by using a bisection search, since increasing values of $\alpha^b$ lead to decreasing values of $\bar{\sigma}(t_{ud}(0, e^{i\omega}))$. The obtained value of $\alpha^b$ can serve as the lower bound for $\alpha_i$ (where i=1, ..., $N_y$) in the temporal tuning and is denoted $\alpha^*$ below.

After robust stability is achieved, the objective of the temporal tuning is to adjust $\alpha_i$ (where i=1, ..., $N_y$) for user-specified temporal performance. Considering the requirements of the end users in pulp and paper industry as an example, the overshoot and settling time of the 2σ (two times the standard deviation) spread of an input/output profile could be utilized as performance indices. Detailed definitions of the 2σ indices are as follows. The "overshoot of the 2σ spread" refers to the overshoot of a stable 2σ spread and is defined as its maximum value minus its final value divided by the final value. The "settling time of the 2σ spread" refers to the settling time of a stable 2σ spread and is defined as the time required for the spread to reach and stay at its final value.

Since the uncertainties considered on the parameters α and $T_d$ end up with a set of perturbed systems, it may be necessary or desirable to develop a visualization technique to characterize all possible 2σ spreads for all input/output profiles. A visualization technique can be used to achieve the 2α spread envelope for a set of single-array CD processes with parametric uncertainty:

$$\alpha^p \in [\underline{\alpha}, \bar{\alpha}], T_d^p \in [\underline{T}_d, \bar{T}_d] \quad (73)$$

via four extreme case systems:

$$\alpha^p \in \{\underline{\alpha}, \bar{\alpha}\}, T_d^p \in \{\underline{T}_d, \bar{T}_d\} \quad (74)$$

The temporal transfer function of each subsystem of G(z) has the same structure as that of a single-array system, and the extreme closed-loop system behavior happens when all extreme parameters are reached simultaneously. Thus, the above method can be extended by only considering $\alpha^p \in \{\underline{\alpha}, \bar{\alpha}\}, T_d^p \in \{\underline{T}_d, \bar{T}_d\}$ to characterize the 2σ envelope responses. Algorithm 3 below represents an example of how to achieve this robust visualization in order to calculate the 2σ spreads.

| Algorithm 3 Calculation of the 2σ spread envelopes |
|---|
| 1: Input the uncertainty level [$\underline{a}, \bar{a}$] and [$\underline{T}_d, \bar{T}_d$] and parameter α; |
| 2: Determine the four worst-case uncertain systems based on extreme combinations of the uncertainty intervals ($a^p \in \{\underline{a}, \bar{a}\}, T_d^p \in \{\underline{T}_d, \bar{T}_d\}$), and then calculate the measurement 2σ spreads $Y_h = [y_1^{2\sigma}, \ldots, y_{N_y}^{2\sigma}]_h^T$ for the hth extreme system (h = 1,2,3,4) based on the constrained CD-MPC in (18). |
| 3: Calculate the upper envelope for all the measurement 2σ spreads $\{\bar{y}_1^{2\sigma}, \ldots, \bar{y}_{N_y}^{2\sigma}\}$ by $\max_{h \in \{1,2,3,4\}} Y_h(k,:)$, for k = 1,...,$N_y$; |
| 4: Calculate the lower envelope for all the measurement 2σ spreads $\{\underline{y}_1^{2\sigma}, \ldots, \underline{y}_{N_y}^{2\sigma}\}$ by $\min_{h \in \{1,2,3,4\}} Y_h(k,:)$, for k = 1,...,$N_y$; |

Note that while Algorithm 3 only shows the calculation for measurement 2σ envelopes, it can also be utilized directly to obtain the envelopes of the 2σ spreads for actuator profiles. The performance of Algorithm 3 can be verified, such as by using the extensive simulation-based method on different types of CD processes.

Based on this, the objective of the temporal tuning can be formulated as follows:

$$\min_\alpha \|T_s(y_1^{2\sigma}, \ldots, y_{N_y}^{2\sigma})\|_\infty$$

$$\text{s.t. } OS(u_j^{2\sigma}) \leq OS^*, j=1, \ldots, N_u \quad (75)$$

Here, $T_s(y_1^{2\sigma}, \ldots, y_{N_y}^{2\sigma}) = [T_s(y_1^{2\sigma}), \ldots, T_s(y_{N_y}^{2\sigma})]$ and $T_s(y_i^{2\sigma})$ (where i=1, ..., $N_y$) is the worst-case (longest) 2σ spread settling time of output $y_i$. Also, $OS(u_j^{2\sigma})$ (where j=1, ..., $N_u$) denotes the worst-case (largest) 2σ spread overshoot of input $u_j$, and OS* denotes the requirement on the worst-case overshoot. In the above tuning objective, users can specify the maximum allowable overshoot on the input 2σs, and the optimization problem in Equation (75) can be solved, yielding the α that provides the smallest worst-case 2σ settling time for each output. In some embodiments, to solve the optimization problem in Equation (75) efficiently, the problem at hand can be split into two steps: (i) tuning in the frequency-domain and (ii) tuning in the time-domain.

In the frequency-domain tuning, the parameter vector $\alpha = [\alpha_1, \ldots, \alpha_{N_y}]$, is adjusted based on the sensitivity analysis. Considering the two-dimensional frequency property of the system, a modified sensitivity function $t_{yd}^f(0, z)$ can be defined based on $t_{yd}(0, z)$ in Equation (37) as follows:

$$t_{yd}^f(0, z) = \begin{bmatrix} \|t_{yd}(0, z)|_{1st\ row}\|_2 \\ \vdots \\ \|t_{yd}(0, z)|_{N_y^{th}\ row}\|_2 \end{bmatrix} \quad (76)$$

in which all channels for each output have been summed with the 2-norm. To achieve the desired performance, upper limits on the channels of the combined sensitivity function can be selected, and the tuning parameters can be adjusted to satisfy the requirements. Define $\kappa_i$ as the upper limit for $t_{yd,i}^f(0, z)$, and the objective becomes tuning α such that:

$$t_{yd,i}^f(0,z) < \kappa_i, \forall i \quad (77)$$

Given the structure of the CD-MPC system, as $f_{\alpha_i}$ (characterized by $\alpha_i$) is only utilized to smooth the reference trajectory for the $i^{th}$ output profile, it is intuitive to assume that the response of the $i^{th}$ output is dominated by $\alpha_i$. Moreover, the dynamic parameters of $f_{\alpha_i}$ are designed based on the dominant subsystem of the $i^{th}$ output profile, which further ensures the dominant property of $\alpha_i$. This property can also be verified, such as with the extensive simulation-based method. Therefore, the frequency-domain tuning portion can be achieved by solving:

$$\alpha_i^f = \max_{k=0,\ldots,k_{max}} \left(\alpha_{i,\omega_k}^m\right), \text{ for } i = 1, \ldots, N_y \quad (78)$$

$$\alpha_{i,\omega_k}^m = \min(\alpha_{i,\omega_k})$$

$$\text{s.t. } \alpha_{i,\omega_k} > \alpha^*, t_{yd,i}^f(0, e^{i\omega_k}) < \kappa_i$$

where $\omega_k$ (where $k=0, \ldots, k_{max}$) are the temporal frequency points located from 0 to the Nyquist frequency. It is known that $\kappa_i$ (where $i=1, \ldots, N_y$) can be selected based on the OS* and the model parameters of the dominant subsystem for the $i^{th}$ output and, in some embodiments, is normally between $k_l=1.2$ and $k_u=1.8$ from industrial experience. Note that the tuning in the frequency-domain may result in a value of $\alpha$ that is not able to guarantee the specification OS* for all channels. Thus, the tuning in the time-domain is performed to fine tune $\alpha$.

In the time-domain tuning, the parameter vector $\alpha$ is fine-tuned to find the optimal $\alpha$ (denoted as $\alpha^t$) that provides the smallest $2\sigma$ settling time for each output profile while still satisfying the requirement on overshoot OS. Based on the analysis above, the $i^{th}$ output profile is dominated by $\alpha_i$, so $\alpha_i$ can be utilized to minimize $T_s(y_i^{2\sigma})$ under the constraints on the $2\sigma$ overshoot. Since $T_s(y_i^{2\sigma})$ is approximately a unimodel function of $\alpha_i$, a golden search or other search can be utilized to find the $\alpha_i^t$ based on a closed-loop simulation with the following procedure. If the maximum overshoot (OS) with $\alpha^f$ is larger than the specification, the search is implemented in the region $\alpha_i \in [\alpha_i^f, \alpha_{u,i}]$, where $\alpha_{u,i}$ is the upper bound for $\alpha_i$ obtained by solving Equation (78) with $\kappa_i=1.2$ and $\alpha_i^f$ is obtained in the frequency tuning. Otherwise, the search can be implemented in the region $\alpha_i \in [\alpha_{l,i}, \alpha_i^f]$, where $\alpha_{l,i}$ is the lower bound for $\alpha_i$ obtained by solving Equation (78) with $\kappa_i=1.8$.

Algorithm 4 below represents an example of how to perform the temporal tuning portion of the CD-MPC tuning algorithm, including both the frequency-domain tuning and the spatial-domain tuning.

---
Algorithm 4 Temporal tuning
---

1: Input OS* and parametric uncertainties on $a_{ij}$ and $T_{d_{ij}}$, $i = 1,\ldots,N_y$, $j = 1,\ldots,N_u$;
2: Calculate the lower bound for robust stability $\alpha^*$ based on (71);
3: Input dynamic Nyquist frequency $\omega_N$;
4: For each tuning parameter $\alpha_i$, solve $$\alpha_i^f = \max_{k=0,\ldots,k_{max}} \left(\alpha_{i,\omega_k}^m\right)$$

$$\alpha_{i,\omega_k}^m = \min(\alpha_{i,\omega_k})$$

$$\text{s.t. } \alpha_{i,\omega_k} > \alpha^*,$$
$$t_{yd,i}^f(0, e^{i\omega_k}) < \kappa_i.$$

Obtain a feasible range for the paramter $\alpha_i$ by settling $\kappa_i = k_l$, and $\kappa_i = k_u$, namely $\alpha_i \in [\alpha_{i,l}, \alpha_{i,u}]$.
5: if $OS(\alpha^f) > OS^*$ then ---
Algorithm 4 Temporal tuning
---

6:     For each tuning parameter $\alpha_i$, search in $[\alpha_i^f, \alpha_{i,u}]$ for $\alpha_i^t$;
7: else
8:     For each tuning parameter $\alpha_i$, search in $[\alpha_{i,l}, \alpha_i^f]$ of $\alpha_i^t$;
9: end if
10: Output $\alpha^t$.
11: end In order to speed up Algorithm 4, the time-domain tuning in lines 5-10 can be implemented based on a counter-line search method, such as that proposed in He et al., "Automated two-degree-of-freedom model predictive control tuning," Industrial & Engineering Chemistry Research, vol. 54, no. 43, October 2015, pp. 10811-10824 (which is hereby incorporated by reference in its entirety). More specifically, the search for $\alpha_i$ can end once the $2\sigma$ overshoot of the dominant sub system equals OS*.

Note that in the time-domain tuning portion described above, the $2\sigma$ indices are calculated based on $2\sigma$ spreads obtained with a constrained CD-MPC. This may require a lot of computational time because a constrained QP is solved repeatedly. The following describes a computationally efficient approach to obtain the $2\sigma$ spreads such that the tuning time can be significantly reduced.

In order to calculate the $2\sigma$ spreads, the constrained QP of CD-MPC needs to be solved at every sampling instant to simulate the output and input profiles. If the QP is solved at selective sampling instants (rather than every sampling instant) while still providing similar $2\sigma$ spreads, the computational efficiency can be improved. The so-called "event-based" sampling/control strategy is a promising solution for this issue. Different from traditional control strategy in which a control input is updated at every sampling instant, event-based control only triggers a control update when a pre-specified condition is no longer satisfied. According to existing results for event-based control, an almost identical control performance can be achieved with a significantly-reduced sampling/control update rate.

Figure 8:
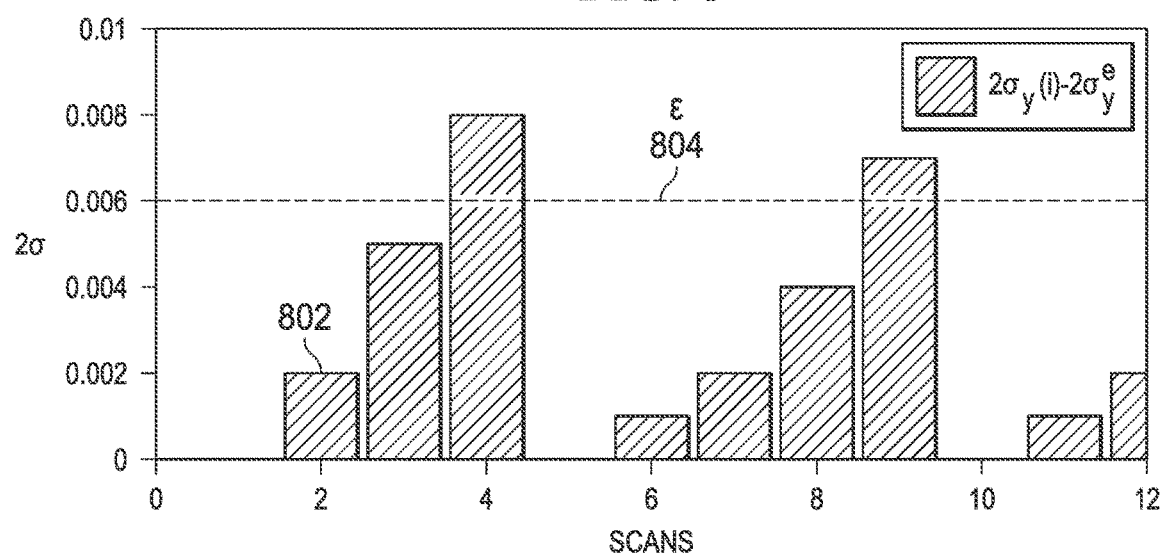
FIG. 8 illustrates example results obtained using event-based control as part of a temporal tuning algorithm according to this disclosure.

Based on this idea, the following condition can be specified to determine the control input update:

$$\|2\sigma_y(i) - 2\sigma_y^e\|_\infty < \varepsilon, \forall i > 1 \quad (79)$$

where $2\sigma_y(i) \in R^{N_y \times l}$ is the measurement $2\sigma$ vector at the $i^{th}$ time instant and $\sigma_y^e$ is the measurement $2\sigma$ at the most recent time instant at which the QP is solved. This condition indicates that when the difference between the current measurement $2\sigma$ and the measurement $2\sigma$ at the most recent triggering instant is larger than a threshold, the QP is solved to update the control input. Otherwise, the control input is not changed, and the same input is applied to the system. Note that the threshold $\varepsilon$ can be selected in various ways, such as based on a user's experience or on initial and approximated steady-state measurement $2\sigma$s. FIG. 8 illustrates example results obtained using event-based control as part of a temporal tuning algorithm according to this disclosure. In FIG. 8, bars 802 indicate the values of $\|2\sigma_y(i) - 2\sigma_y^e\|_\infty$, and a line 804 represents the threshold $\varepsilon$. It can be observed that when a bar 802 rises above the line 804, the MPC is triggered to update the input so that $\|2\sigma_y(i) - 2\sigma_y^e\|_\infty = 0$ at the next time instant.

Algorithm 5 below represents an example of how to perform this event-based processing.

| | Algorithm 5 Event-triggered simulation of the CD-MPC |
|---|---|
| 1: | Input the model parameters and controller parameters; |
| 2: | SolveQP ← 1; |
| 3: | DeadTime ← ceil$\left(\frac{\max(\max(T_d))}{\Delta T}\right)$; |
| 4: | Input ε; |
| 5: | for i=1:loopnumber do |
| 6: |   if SolveQP==1 then; |
| 7: |     Call mpcMultiplantcontroller for dU; |
| 8: |   else |
| 9: |     dU = 0; |
| 10: |   end if |
| 11: |   Update the input profile U based on the dU. |
| 12: |   Update the output profile based on the input profile; |
| 13: |   if SolveQP==1 then; |
| 14: |     $2\sigma_y^e = 2\sigma_y(i)$; |
| 15: |   end if |
| 16: |   if i>DeadTime then; |
| 17: |     if $\max(2\sigma_y(i) - 2\sigma_y^e) > \epsilon$ then; |
| 18: |       SolveQP ← 1; |
| 19: |     else |
| 20: |       SolveQP ← 0; |
| 21: |     end if |
| 22: |   end if |
| 23: | end for |
| 24: | Output the input and output profiles; |
| 25: | End of the algorithm. |

The above description has described an automated robust tuning algorithm for multiple-array CD model-based control with user-specified parametric uncertainties. Based on the RCM property of the CD processes, the system model can be represented in the two-dimensional frequency-domain. As a result, the tuning algorithm can be divided into two separated portions: (i) spatial tuning and (ii) temporal tuning. In the spatial tuning, the weighting matrices $S_{b,j}$ (where j=1, . . . , $N_u$) are designed to shape the spatial spectrum of each actuator profile based on the frequency property of the system, and an automated tuning algorithm is used to adjust the weights based on the amount of the parametric uncertainties. In the temporal tuning, a systematic algorithm is used to tune the parameter α for the user-specified time-domain performance requirement under the parametric uncertainties.

Although FIGS. 3 through 8 illustrate example details related to the CD-MPC tuning algorithm described above, various changes may be made to FIGS. 3 through 8. For example, industrial systems could have representations different from those shown in FIGS. 3 and 4. Also, the contents of the graphs in FIGS. 5 through 8 are illustrative only.

Figure 9:
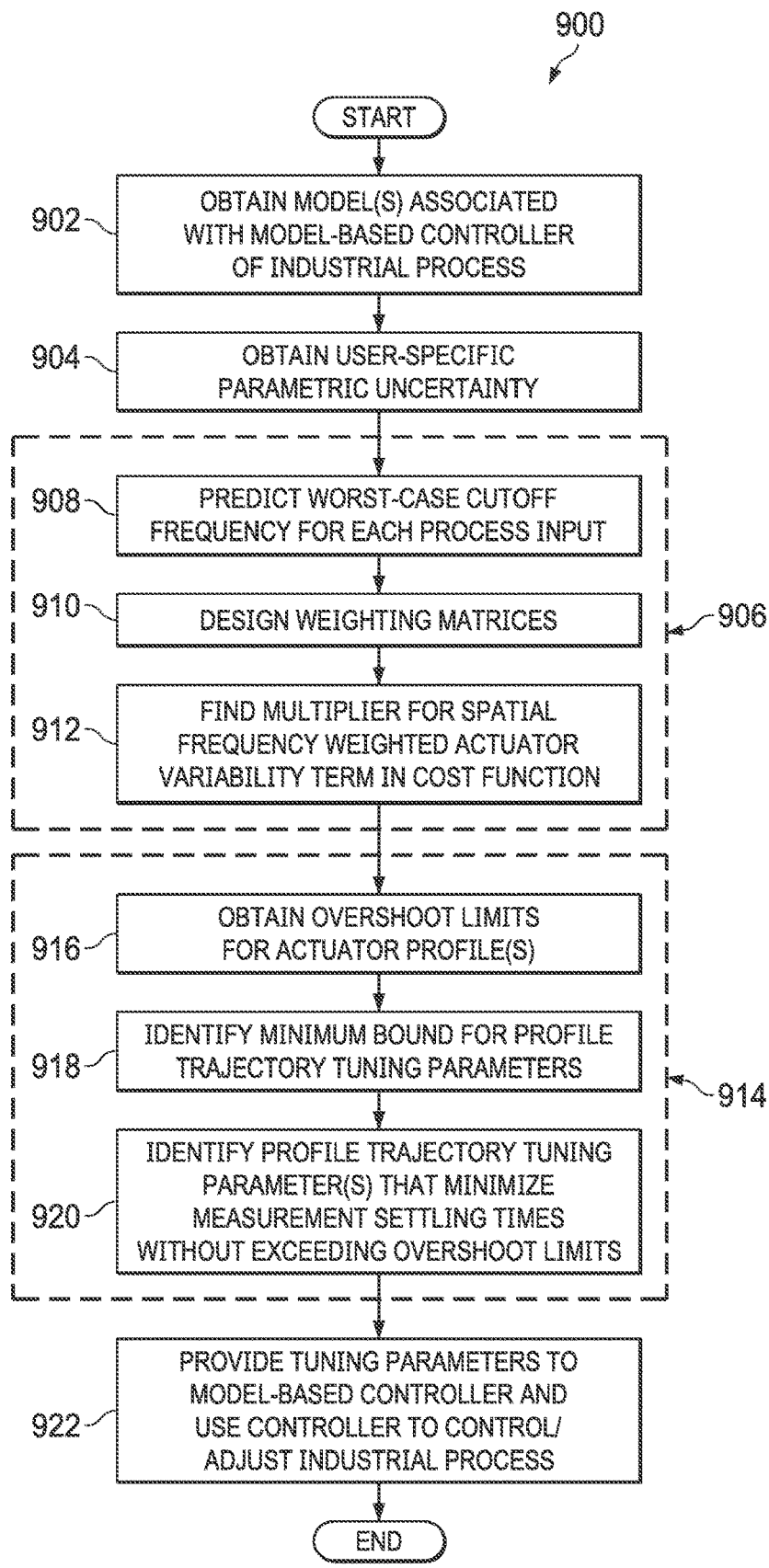
FIG. 9 illustrates an example method for tuning the operation of a model-based controller according to this disclosure.

FIG. 9 illustrates an example method 900 for tuning the operation of a model-based controller according to this disclosure. For ease of explanation, the method 900 is described as being performed using the device 200 of FIG. 2 for the controller 104 in the system 100 of FIG. 1. However, the method 900 could be used with any other suitable device, controller, or system.

As shown in FIG. 9, at least one model associated with a model-based controller in an industrial process is obtained as step 902. This could include, for example, the processor 202 of the device 200 obtaining the process model(s) from a user, a memory, or other source or generating the process model(s). The industrial process here has multiple actuators. Each model could be represented in a two-dimensional frequency-domain. Each model could be associated with an MPC controller, such as the controller 104 in the system 100. The industrial process could represent a web manufacturing or processing system, such as the paper machine 102 in the system 100. At least one user-specific parametric uncertainty is obtained at step 904. This could include, for example, the processor 202 of the device 200 receiving input from a user defining the parametric uncertainty. The parametric uncertainty can relate to one or more spatial and/or temporal parameters of the model(s).

Spatial tuning for the controller is performed at step 906. This could include, for example, the processor 202 of the device 200 analyzing data in order to identify weighting matrices for the controller 104. The weighting matrices are used by the controller 104 to suppress one or more frequency components in actuator profiles of the actuators in the industrial process. The weighting matrices are also used to shape a spatial spectrum of each actuator profile.

In the example shown in FIG. 9, the spatial tuning includes predicting the worst-case cutoff frequency for each process input based on the model(s) and the parametric uncertainty at step 908. This could include, for example, the processor 202 of the device 200 predicting the worst-case cutoff frequencies as described above. Weighting matrices are designed based on the worst-case cutoff frequencies at step 910. This could include, for example, the processor 202 of the device 200 designing the weighting matrices $S_{b,j}$ as high-pass spatial filters, where each filter has a passband $v_{b,j}$ equal to or based on one of the worst-case cutoff frequencies. The weighting matrices $S_{b,j}$ can be designed to penalize high-frequency actuator variability. A general weight (or multiplier) is identified to guarantee robust spatial stability at step 912. This could include, for example, the processor 202 of the device 200 tuning the general weight $q_f$ as described above. The general weight $q_f$ can be used to calculate one or more tuning parameters (such as $Q_3$ and $Q_4$), and at least one of these tuning parameters (such as $Q_4$) can be calculated using the weighting matrices. The tuning parameters can be tuned in this matter to reduce the spatial variability of measurement profiles in the industrial process. The measurement profiles could identify characteristics of a web 108 being manufactured or processed.

Temporal tuning for the controller is performed at step 914. This could include, for example, the processor 202 of the device 200 analyzing data in order to identify one or more parameters of a multivariable filter, such as the temporal filter 308. The filter is used to smooth at least one reference trajectory of at least one actuator profile of the actuators. This is done in order to achieve a user-specified temporal performance while operating under the parametric uncertainty provided by the user.

In the example shown in FIG. 9, the temporal tuning includes obtaining overshoot limits for one or more actuator profiles at step 916. This could include, for example, the processor 202 of the device 200 identifying 2σ overshoot limits based on spread envelopes as described above. One or more minimum bounds are identified for one or more profile trajectory tuning parameters at step 918. This could include, for example, the processor 202 of the device 200 identifying the lower bound $\alpha^b$ for parameters $\alpha_i$ (where i=1, . . . , $N_y$), where the parameters $\alpha_i$ represent temporal filter parameters. One or more profile trajectory tuning parameters that minimize measurement settling times without exceeding overshoot limits are identified at step 920. This could include, for example, the processor 202 of the device 200 performing frequency-domain tuning and time-domain tuning. The frequency-domain tuning can involve identifying $\alpha_i$ values that satisfy the lower bound $\alpha^b$, while the time-domain tuning can involve fine-tuning the $\alpha_i$ values to identify the optimal α that provides the smallest 2σ settling time for each output profile while still satisfying the requirement on the overshoot.

The tuning parameters are provided to the model-based controller so that the controller is able to use the tuning parameters to control or adjust the industrial process at step 922. This could include, for example, the processor 202 of the device 200 outputting the $Q_3$, $Q_4$, and $\alpha_i$ tuning parameters to the controller 104. The controller 104 is able to use these tuning parameters during its execution of control logic when controlling one or more actuators or actuator arrays in the industrial process (the paper machine 102). Thus, modification of the tuning parameters helps to increase or maximize the effectiveness of the controller 104 in controlling the industrial process. As a result, one or more physical characteristics of the web 108 can be more effectively controlled in order to increase the quality of the web 108.

Although FIG. 9 illustrates one example of a method 900 for tuning the operation of a model-based controller, various changes may be made to FIG. 9. For example, while shown as a series of steps, various steps in FIG. 9 could overlap, occur in parallel, occur in a different order, or occur any number of times. Also, various steps in FIG. 9 could be omitted, such as when only spatial tuning or only temporal tuning of a model-based controller is needed or desired.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining one or more models associated with a model-based controller in an industrial process having multiple actuator arrays; and
performing spatial tuning of the controller, wherein the spatial tuning comprises identifying weighting matrices that suppress one or more frequency components in actuator profiles of the actuator arrays, wherein the weighting matrices are based on bending and picketing, the weighted matrices are further based on scalar weights and a bending moment matrix with dimension for each actuator profile.

2. The method of claim 1, further comprising:
performing temporal tuning of the controller.

3. The method of claim 1, wherein each of the one or more models is represented in a two-dimensional frequency domain.

4. The method of claim 1, wherein the spatial tuning comprises using the weighting matrices to shape a spatial spectrum of each of the actuator profiles.

5. The method of claim 4, wherein the spatial tuning further comprises adjusting the weighting matrices based on user-specific parametric uncertainty.

6. The method of claim 1, wherein the spatial tuning further comprises:
for each process input, finding a worst-case cutoff frequency over all output channels considering the one or more models, given parametric uncertainty;
based on the one or more models and the worst-case cutoff frequencies, designing the weighting matrices to penalize higher-frequency actuator variability; and
finding a multiplier for a spatial frequency weighted actuator variability term in a cost function that guarantees robust spatial stability.

7. The method of claim 1, wherein the spatial tuning further comprises:
providing one or more terms of a cost function to the model-based controller, the model-based controller configured to use the cost function during control of the industrial process such that a change to the one or more terms of the cost function alters operation of the model-based controller and the industrial process, at least one of the one or more terms based on the weighting matrices.

8. An apparatus comprising:
at least one memory configured to store one or more models associated with a model-based controller in an industrial process having multiple actuator arrays; and
at least one processing device configured to perform spatial tuning of the controller;
wherein, to perform the spatial tuning, the at least one processing device is configured to identify weighting matrices that suppress one or more frequency components in actuator profiles of the actuator arrays, wherein the weighting matrices are based on bending and picketing, the weighted matrices are further based on scalar weights and a bending moment matrix with dimension for each actuator profile.

9. The apparatus of claim 8, wherein the at least one processing device is further configured to perform temporal tuning of the controller.

10. The apparatus of claim 8, wherein each of the one or more models is represented in a two-dimensional frequency domain.

11. The apparatus of claim 8, wherein, to perform the spatial tuning, the at least one processing device is configured to use the weighting matrices to shape a spatial spectrum of each of the actuator profiles.

12. The apparatus of claim 11, wherein, to perform the spatial tuning, the at least one processing device is configured to adjust the weighting matrices based on user-specific parametric uncertainty.

13. The apparatus of claim 8, wherein, to perform the spatial tuning, the at least one processing device is further configured to:
for each process input, find a worst-case cutoff frequency over all output channels considering the one or more models, given parametric uncertainty;
based on the one or more models and the worst-case cutoff frequencies, design the weighting matrices to penalize higher-frequency actuator variability; and
find a multiplier for a spatial frequency weighted actuator variability term in a cost function that guarantees robust spatial stability.

14. The apparatus of claim 8, wherein the at least one processing device is further configured to provide one or more terms of a cost function to the model-based controller, the model-based controller configured to use the cost function during control of the industrial process such that a change to the one or more terms of the cost function alters operation of the model-based controller and the industrial process, at least one of the one or more terms based on the weighting matrices.

15. A non-transitory computer readable medium containing instructions that when executed cause at least one processing device to:
obtain one or more models associated with a model-based controller in an industrial process having multiple actuator arrays; and
perform spatial tuning of the controller, wherein the spatial tuning comprises identifying weighting matrices that suppress one or more frequency components in actuator profiles of the actuator arrays, wherein the weighting matrices are based on bending and picketing, the weighted matrices are further based on scalar weights and a bending moment matrix with dimension for each actuator profile.

16. The non-transitory computer readable medium of claim 15, further containing instructions that when executed cause the at least one processing device to perform temporal tuning of the controller.

17. The non-transitory computer readable medium of claim 15, wherein the instructions that when executed cause the at least one processing device to perform the spatial tuning comprise:
instructions that when executed cause the at least one processing device to use the weighting matrices to shape a spatial spectrum of each of the actuator profiles.

18. The non-transitory computer readable medium of claim 17, wherein the instructions that when executed cause the at least one processing device to perform the spatial tuning comprise:
instructions that when executed cause the at least one processing device to adjust the weighting matrices based on user-specific parametric uncertainty.

19. The non-transitory computer readable medium of claim 15, wherein the instructions that when executed cause the at least one processing device to perform the spatial tuning comprise:
instructions that when executed cause the at least one processing device to:
for each process input, find a worst-case cutoff frequency over all output channels considering the one or more models, given parametric uncertainty;
based on the one or more models and the worst-case cutoff frequencies, design the weighting matrices to penalize higher-frequency actuator variability; and
find a multiplier for a spatial frequency weighted actuator variability term in a cost function that guarantees robust spatial stability.

20. The non-transitory computer readable medium of claim 15, further containing instructions that when executed cause the at least one processing device to:
provide one or more terms of a cost function to the model-based controller, the model-based controller configured to use the cost function during control of the industrial process such that a change to the one or more terms of the cost function alters operation of the model-based controller and the industrial process, at least one of the one or more terms based on the weighting matrices.

* * * * *